United States Patent
Hasunuma et al.

(10) Patent No.: US 11,858,140 B2
(45) Date of Patent: Jan. 2, 2024

(54) ROBOT SYSTEM AND SUPPLEMENTAL LEARNING METHOD

(71) Applicant: KAWASAKI JUKOGYO KABUSHIKI KAISHA, Kobe (JP)

(72) Inventors: Hitoshi Hasunuma, Kobe (JP); Takuya Shitaka, Kakogawa (JP); Takeshi Yamamoto, Kobe (JP); Kazuki Kurashima, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 353 days.

(21) Appl. No.: 17/058,770

(22) PCT Filed: May 24, 2019

(86) PCT No.: PCT/JP2019/020697
§ 371 (c)(1),
(2) Date: Nov. 25, 2020

(87) PCT Pub. No.: WO2019/225746
PCT Pub. Date: Nov. 28, 2019

(65) Prior Publication Data
US 2021/0197369 A1 Jul. 1, 2021

(30) Foreign Application Priority Data

May 25, 2018 (JP) .................................. 2018-100520
Dec. 27, 2018 (JP) .................................. 2018-245459

(51) Int. Cl.
*B25J 9/16* (2006.01)
*B25J 13/08* (2006.01)

(52) U.S. Cl.
CPC ............. *B25J 9/163* (2013.01); *B25J 9/1697* (2013.01); *B25J 9/1602* (2013.01); *B25J 9/1679* (2013.01); *B25J 13/08* (2013.01)

(58) Field of Classification Search
CPC ........ B25J 9/163; B25J 6/1697; B25J 9/1602; B25J 13/08
See application file for complete search history.

(56) References Cited

U.S. PATENT DOCUMENTS 6,031,973 A * 2/2000 Gomi ....................... B25J 9/161
  718/1
2007/0250461 A1 * 10/2007 Sabe ..................... G06N 20/00
  706/12

(Continued)

FOREIGN PATENT DOCUMENTS

JP 2017-7064 A 1/2017
JP 2017-30135 A 2/2017

OTHER PUBLICATIONS

Daniel Kappler, Jul. 13, 2015, "Data-Driven Online Decision Making for Autonomous Manipulation" pp. 1-9. (Year: 2015).*

(Continued)

*Primary Examiner* — Jonathan L Sample
*Assistant Examiner* — Mohammed Yousef Abuelhawa
(74) *Attorney, Agent, or Firm* — Oliff PLC

(57) ABSTRACT

A robot system includes a robot, state detection sensors to, a timekeeping unit, a learning control unit, a determination unit, an operation device, and an input unit, and an additional learning unit. The determination unit determines whether or not the work of the robot can be continued under the control of the learning control unit based on the state values detected by the state detection sensors to and outputs determination result. The additional learning unit performs additional learning of the determination result indicating that the work of the robot cannot be continued, the operator operation force, work state output by the operation device and the input unit, and timer signal output by the timekeeping unit.

19 Claims, 15 Drawing Sheets

(56) References Cited

U.S. PATENT DOCUMENTS

| | | | | |
|---|---|---|---|---|
| 2014/0163730 | A1* | 6/2014 | Mian | B25J 9/16 |
| | | | | 700/248 |
| 2017/0028562 | A1* | 2/2017 | Yamazaki | B25J 9/1697 |
| 2018/0001485 | A1* | 1/2018 | Yokoya | B25J 13/085 |
| 2018/0117758 | A1* | 5/2018 | Wang | B25J 9/0081 |
| 2018/0204111 | A1* | 7/2018 | Zadeh | G06N 3/0436 |
| 2018/0225113 | A1* | 8/2018 | Hasegawa | B25J 9/161 |
| 2019/0176334 | A1* | 6/2019 | Zhou | B25J 9/1689 |

OTHER PUBLICATIONS

Aug. 20, 2019 International Search Report issued in Internaitonal Patent Application No. PCT/JP2019/020697.

Kappler, D. et al., "Data-Driven Online Decision Making for Autonomous Manipulation," pp. 1-9.

* cited by examiner

Fig.3 current work state : work state 2 (contact)
next work state : work state 3 (insertion)

| time (second) | state value | operation force |
|---|---|---|
| 0 | $S_{210}$ | $I_{210}$ |
| 1 | $S_{211}$ | $I_{211}$ |
| ⋮ | ⋮ | ⋮ |
| (n-1) | $S_{21(n-1)}$ | $I_{21(n-1)}$ |
| n | $S_{310}$ | $I_{null}$ |

Fig.6
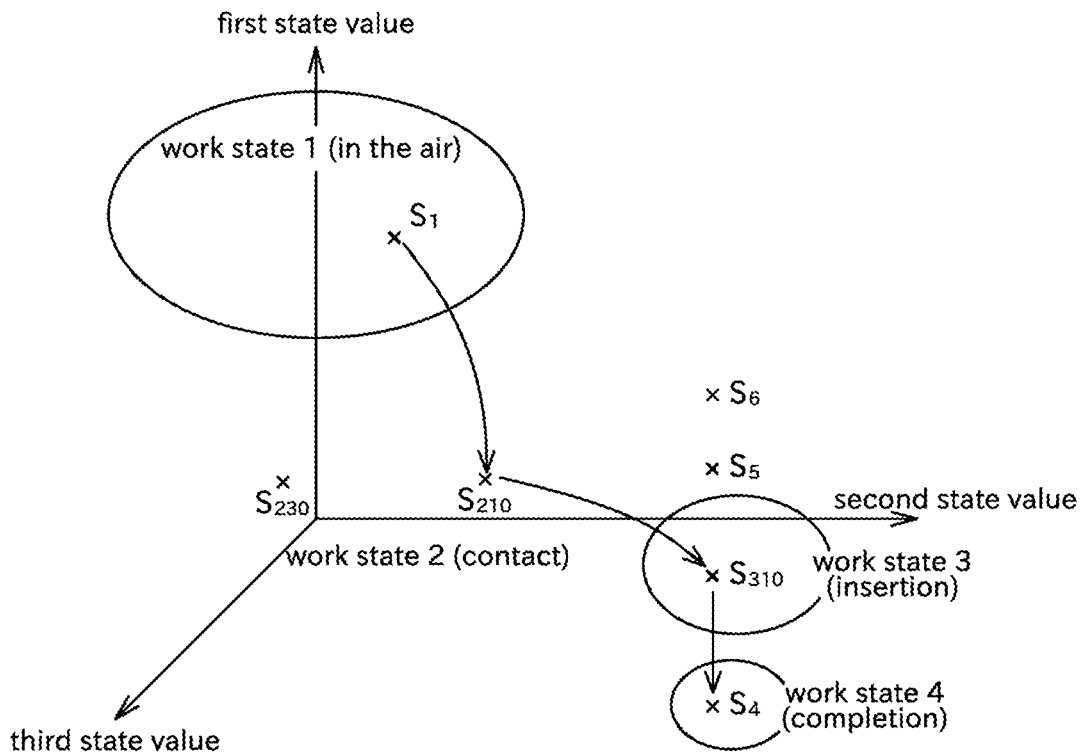
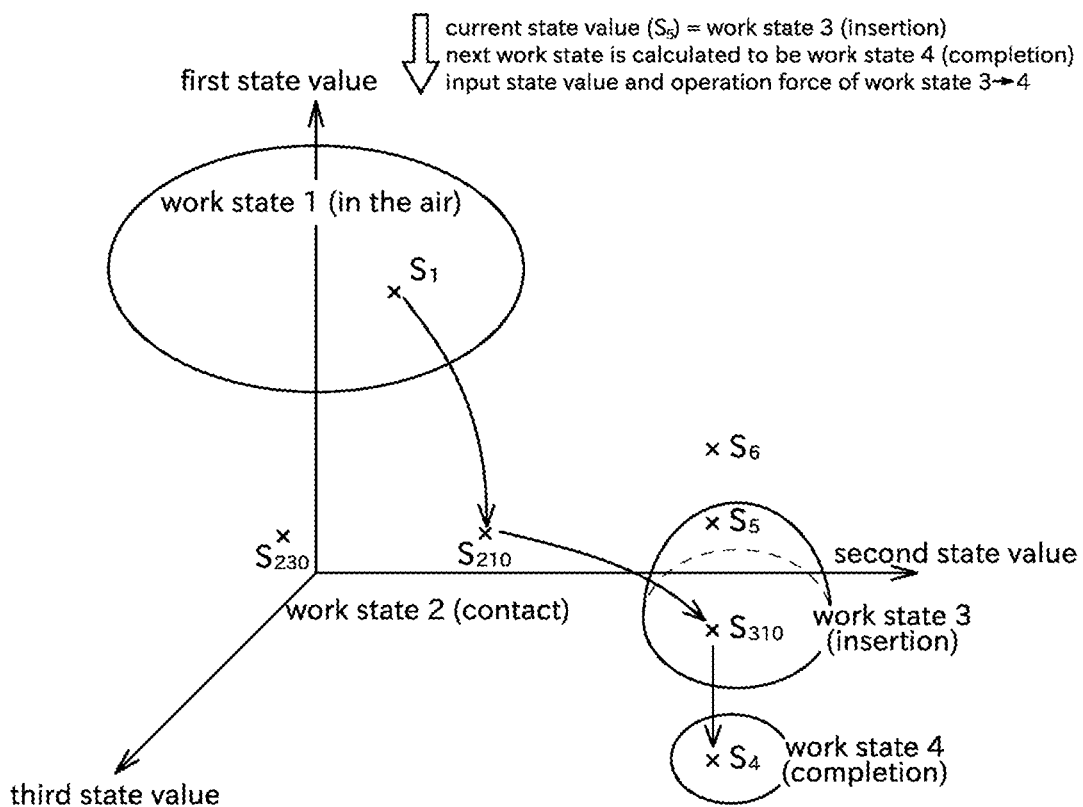

Fig.7
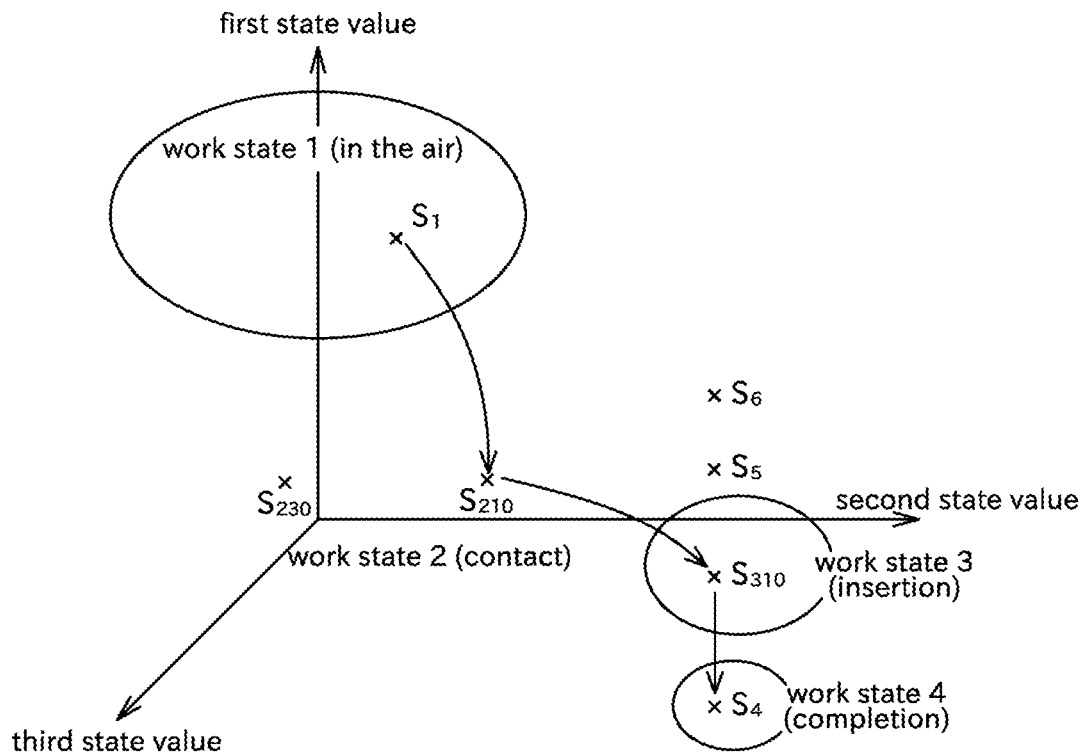
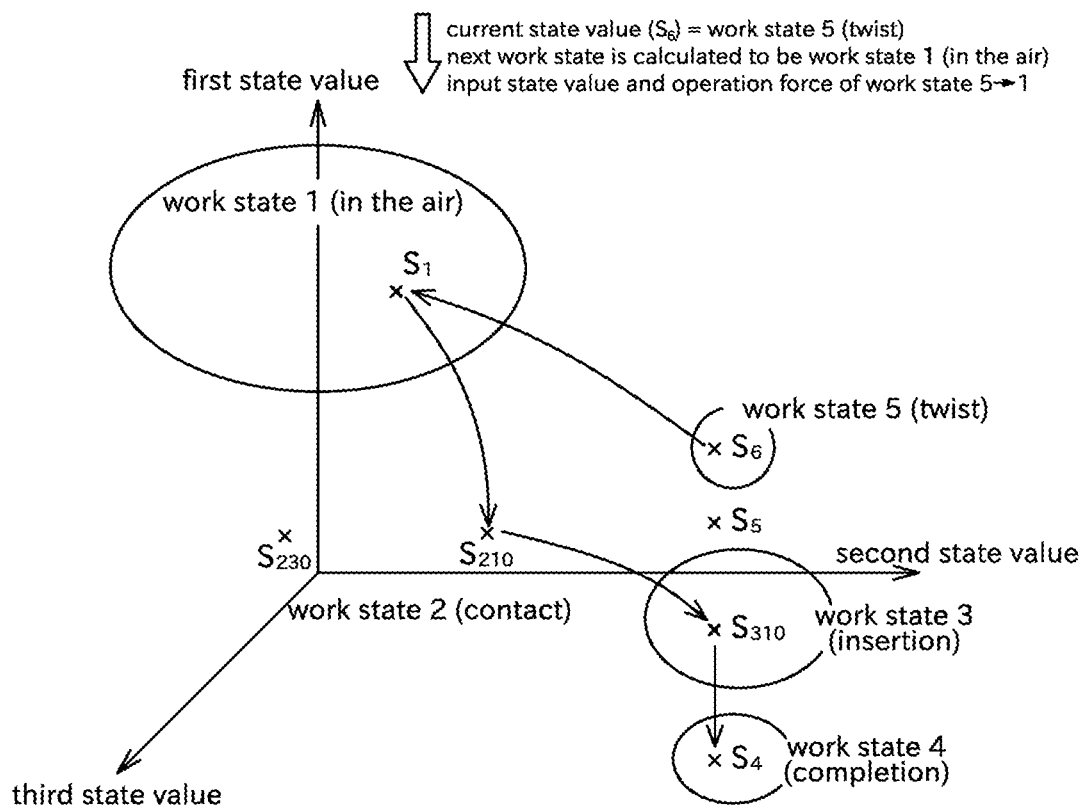

Fig.8 current work state : work state 3 (insertion)
next work state : work state 4 (completion)

| time (second) | state value | operation force (operator operation force) |
|---|---|---|
| 0 | $S_5$ | $I_{310}$ |
| ⋮ | ⋮ | ⋮ |
| (p-1) | $S_{5(p-1)}$ | $I_{31(p-1)}$ |
| p | $S_4$ | $I_{null}$ |

Fig.9 current work state : work state 5 (twist)
next work state : work state 1 (in the air)

| time (second) | state value | operation force (operator operation force) |
|---|---|---|
| 0 | $S_6$ | $I_{510}$ |
| ⋮ | ⋮ | ⋮ |
| (q-1) | $S_{6(q-1)}$ | $I_{51(q-1)}$ |
| q | $S_1$ | $I_{null}$ |

ROBOT SYSTEM AND SUPPLEMENTAL LEARNING METHOD

TECHNICAL FIELD

The present invention mainly relates to a robot system in which a robot is made to perform a work based on a model constructed by machine learning.

BACKGROUND ART

Patent Document 1 discloses an assembly method in which a plurality of parts are assembled by controlling a robot arm. In this assembly method, the coordinates of the two parts held by the robot arm are acquired, and when it is determined that the coordinates of the two parts are appropriate, both parts are connected.

Patent Document 2 discloses a method of learning the operation of a robot that grips and moves one workpiece from a plurality of workpieces by a machine learning device. By controlling the robot based on the output of the machine learning device, the robot takes out a desired work even in a situation where a plurality of workpieces are randomly placed.

CITATION LIST

Patent Literature

[Patent Document 1] Japanese Unexamined Patent Publication No. 2017-7064
[Patent Document 2] Japanese Unexamined Patent Publication No. 2017-30135

SUMMARY OF INVENTION

Technical Problem

In the method of Patent Document 1, for example, when the robot arm is caught and cannot operate, the robot arm cannot continue the work. Further, in the method of Patent Document 2, the robot cannot continue the work when the situation has not been learned in advance.

The present invention has been made in view of the above circumstances, and the main primary thereof is to provide a robot system performing a additional learning so that a work can be continued when the robot cannot continue the work and the next time the same situation occurs.

Solution to Problem

Problems to be solved by the present invention are as described above, and solutions to the problems and advantageous effects thereof will now be described.

An aspect of the present invention provides a robot system as follows. The robot system includes a robot, a state detection sensor, a timekeeping unit, a learning control unit, a determination unit, an operation device, an input unit, a switching device, and an additional learning unit. The robot performs work based on an operation command. The state detection sensor detects and outputs a state value indicating the progress of the work of the robot. The timekeeping unit outputs a timer signal at predetermined time intervals. The learning control unit outputs a calculation operation force based on the state value detected by the state detection sensor and the timer signal by using a model, the model being constructed by machine learning of a work state, a next work state associated with the work state, and at least one set of the state value and the operation force associated with the state value. The determination unit outputs a determination result indicating whether or not the work of the robot can be continued under the control of the learning control unit based on the state value detected by the state detection sensor. The operation device is operated by an operator, the operation device being detecting and outputting an operator operation force that is an operation force applied by the operator. The input unit accepts an input of the work state by the operator and outputting the input. The switching device converts either the operator operation force or the calculation operation force into the operation command and outputs the operation command based on the operator operation force and the calculation operation force. The additional learning unit additionally learns the work state, the next work state associated with the work state, and at least one set of the state value and the operation force associated with the state value and updating the model based on the determination result indicating that the work of the robot cannot be continued, the work state output by the input unit, the operator operation force output by the operation device, the state value detected by the state detection sensor, and the timer signal.

An another aspect of the present invention provides an additional learning method as follows. The additional learning method is a method for a robot system. the robot system includes a robot, a state detection sensor, a timekeeping unit, a learning control unit, an operation device, and a switching device. The additional learning method includes a determination step, an input receiving step, and an additional learning step. In the determination step, a determination result indicating whether or not the work of the robot can be continued under the control of the learning control unit based on the state value detected by the state detection sensor is outputted. In the input receiving step, input of the work state and the operator operation force from the operation device is accepted. In the additional learning step, object of additionally learning are the work state, the next work state associated with the work state, and at least one set of the state value and the operation force associated with the state value and updating the model based on the determination result indicating that the work of the robot cannot be continued, the work state input in the input receiving step, the operator operation force input in the input receiving step, the state value detected by the state detection sensor, and the timer signal.

As a result, even if the robot cannot continue the work, the robot system can autonomously solve the problem by additionally learning the work state and the next work state, the operation force, and the state value. It becomes possible to continue the work.

Advantageous Effects of Invention

The present invention provides a robot system performing a additional learning so that a work can be continued when the robot cannot continue the work and the next time the same situation occurs.

BRIEF DESCRIPTION OF DRAWINGS

FIG. 3 is a diagram showing an example of machine learning data.

FIG. 6 is a diagram conceptually showing the contents of additional learning when the current work state is input as the work state in the model.

FIG. 7 is a diagram conceptually showing the content of additional learning when the current work state is input as a new work state and the operation of returning to the previous work state is input.

FIG. 8 is a diagram showing an example of data to be additionally learned when the current work state is input as the work state in the model.

FIG. 9 is a diagram showing an example of data to be additionally learned when the current work state is input as a new work state.

DESCRIPTION OF EMBODIMENTS

Figure 1:
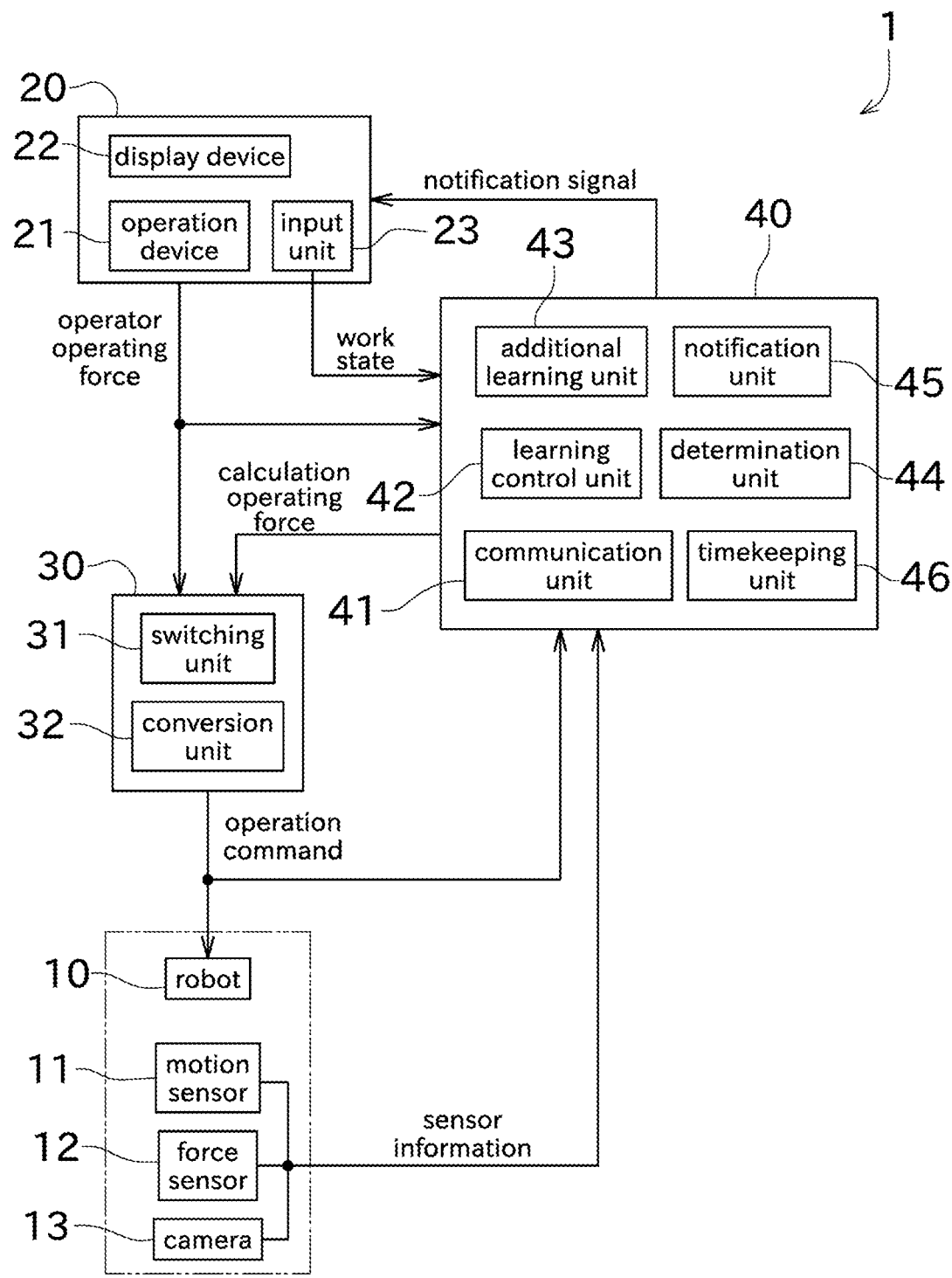
FIG. 1 is a block diagram showing a configuration of a robot system according to a first embodiment.

Next, an embodiment of the present invention will be described with reference to the drawings. First, the robot system 1 of the first embodiment will be described with reference to FIG. FIG. 1 is a block diagram showing a configuration of the robot system 1.

The robot system 1 is a system for causing the robot 10 to perform work. There are various works to be performed by the robot 10, and examples thereof include assembly, processing, painting, and cleaning. The robot 10 is controlled using a model constructed by machine learning the data described later. Therefore, the robot system 1 basically does not require the assistance of an operator and can perform the work autonomously. The autonomous operation of the robot 10 in this way is sometimes referred to as "autonomous operation". In the robot system 1 of the present embodiment, the robot 10 can be operated according to the operation of the operator. The robot 10 can not only perform the work autonomously, but also perform the work according to the operation of the operator. As shown in FIG. 1, the robot system 1 includes a robot 10, an operation unit 20, a switching device 30, and a control unit 40. Each device is connected to each other via a wired or wireless network.

The robot 10 includes an arm portion attached to a pedestal. The arm portion has a plurality of joints, and each joint is provided with an actuator. The robot 10 operates the arm portion by operating the actuator in response to an operation command input from the outside. The operation command includes a linear velocity command and an angular velocity command. An end effector according to the work content is attached to the tip of the arm portion. The robot 10 performs work by operating an end effector in response to an operation command input from the outside.

The robot 10 is equipped with a sensor for detecting the operation of the robot 10 and the surrounding environment. In this embodiment, the motion sensor 11, the force sensor 12, and the camera 13 are attached to the robot 10. The motion sensor 11 is provided for each joint of the arm portion of the robot 10 and detects the rotation angle or angular velocity of each joint. The force sensor 12 detects the force received by the robot 10 during the operation of the robot 10. The force sensor 12 may be configured to detect the force applied to the end effector, or may be configured to detect the force applied to each joint of the arm portion. The force sensor 12 may be configured to detect a moment in place of or in addition to the force. The camera 13 detects an image of the work to be worked on (progress of work on the work). In place of or in addition to the camera 13, a sound sensor for detecting sound and/or a vibration sensor for detecting vibration may be provided, and the progress of work on the work can be detected based on the detection results of these sensors. The data detected by the motion sensor 11 is motion data indicating the motion of the robot 10, and the data detected by the force sensor 12 and the camera 13 is ambient environment data indicating the state of the environment around the robot 10. The data detected by the sensor 11, the force sensor 12, and the camera 13 are state values indicating the progress of the work (work on the workpiece) of the robot 10. In the following description, the motion sensor 11, the force sensor 12, and the camera 13 provided in the robot 10 may be collectively referred to as "state detection sensors 11 to 13". Further, the data detected by the state detection sensors 11 to 13 may be particularly referred to as "sensor information". The state detection sensors 11 to 13 may be provided around the robot 10 instead of being attached to the robot 10.

The operation unit 20 includes an operation device 21, a display device 22, and an input unit 23. The operation device 21 is a member operated by an operator to operate the robot 10. The operation device 21 is different depending on the work content, but is, for example, a lever operated by the operator or a pedal operated by the foot. The operation device 21 includes a known operation force detection sensor (not shown). The operation force detection sensor (force detection sensor) detects the operation force, which is the force applied by the operator to the operation device 21. When the operation device 21 is configured to be movable in various directions, the operation force may be a value including the direction and magnitude of the force, for example a vector. The operation force is not only the force (N) applied by the operator, but also the acceleration (that is, the value obtained by dividing the force applied by the operator by the mass of the operation device 21), which may be a value linked to the force. In the following description, the operation force applied by the operator to the operation device 21 may be particularly referred to as "operator operation force". The operator operation force output by the operator operating the operation unit 20 (operation device 21) is converted into an operation command by the switching device 30 as described later.

The display device 22 is a dot matrix type display such as a liquid crystal or an organic EL. The display device 22 is arranged in the vicinity of the operation device 21 and displays information on the work performed by the robot system 1 based on a video signal, for example, a notification signal described later. When the operation device 21 is arranged at a position away from the robot 10, the display device 22 may display an image in the vicinity of the robot

10. The input unit 23 is a key or the like that receives the input of the work state by the operator at the time of additional learning described later, and outputs the input work state to the control unit 40 (additional learning unit 43).

A robot 10, an operation unit 20, and a control unit 40 are connected to the switching device 30. The operator operation force output by the operation unit 20 and the calculation operation force output by the control unit 40, which will be described later, are input to the switching device 30. The switching device 30 outputs an operation command for operating the robot 10 to the robot 10 and the control unit 40 (communication unit 41). The switching device 30 is composed of, for example, a known computer, and includes an arithmetic unit (CPU, etc.) and a storage unit (for example, ROM, RAM, HDD, etc.). The switching device 30 can function as various means by reading and executing the program stored in the storage unit by the arithmetic unit. When a name is given for each function, the switching device 30 includes a switching unit 31 and a conversion unit 32.

The switching unit 31 is configured to output either the operator operation force or the calculation operation force to the conversion unit 32 from the input operator operation force and calculation operation force. The switching unit 31 is provided with a connector or an antenna, and outputs either the operator operation force or the calculation operation force to the conversion unit 32 based on a setting signal which is received from outside of the switching device indicating whether to convert the operator operation force or the calculation operation force. As a result, a state in which the operator operates the robot 10 (that is, the robot 10 works based on the operator operation force output by the operation unit 20) and a state in which the robot system 1 autonomously make the robot 10 work (that is, the robot 10 works based on the calculation operation force output by the control unit 40) can be switched. The switching unit 31 may be provided with a sensor (not shown), and the switching unit 31 outputs the operator operation force to the conversion unit 32 when the switching unit 31 determines that the operator operates the operation unit 20 (operation device 21), for example the switching device 31 determines the value of the operator operation force is more than a threshold value. The switching unit 31 outputs the calculation operation force to the conversion unit 32 when the switching unit 31 determines that the operator does not operate the operation unit 20, for example the switching device 31 determines the value of the operator operation force is less than a threshold value. As a result, the switching unit 31 can be in a state in which the operator operates the robot 10 while the operator is operating the operation unit 20 without being based on the setting signal.

The conversion unit 32 converts either the operator operation force or the calculation operation force input from the switching unit 31 into an operation command for operating the robot 10, and the conversion unit 32 outputs the operation command to the robot 10 and the control unit 40 (communication unit 41).

The control unit 40 is composed of a known computer, and includes an arithmetic unit (CPU, etc.) and a storage unit (for example, ROM, RAM, HDD, etc.). The control unit 40 can function as various means by reading and executing the program stored in the storage unit by the arithmetic unit. When named for each function, the control unit 40 includes a communication unit 41, a learning control unit 42, an additional learning unit 43, a determination unit 44, a notification unit 45, and a timekeeping unit 46. The communication unit 41 includes a connector or an antenna, and is configured to output an input from the outside of the control unit 40 to each unit 42 to 46 in the control unit 40. The communication unit 41 is configured to output the output from each unit 42 to 46 in the control unit 40 to the outside of the control unit 40. For example, the input from the outside of the control unit 40 received by the communication unit 41 includes the operator operation force output by the operation unit 20 (operation device 21), the work state output by the operation unit 20 (input unit 23), the operation commands output by the switching device 30 (conversion unit 32), and the sensor information output by the state detection sensors 11 to 13. The output which the communication unit 41 outputs to the outside of the control unit 40 is for example, the calculation operation force output to the switching device 30 described later and the notification signal output to the operation unit 20 (display device 22) described later are used. Hereinafter, the input/output of each unit 42 to 46 in the control unit 40 to the outside of the control unit 40 may not be particularly referred to via the communication unit 41. The timekeeping unit 46 has a well-known timekeeping function using an internal clock of the arithmetic unit or the like. The timekeeping function includes, for example, a timer function that starts output of a timer signal at a predetermined time interval (for example, every second) from the time when the trigger signal is input, based on a trigger signal from the outside of the timekeeping unit 46. The timekeeping unit 46 may be a timer that starts outputting a timer signal at the time interval from the time when the trigger signal is input, based on a trigger signal from the outside of the timekeeping unit 46 and a signal indicating a time interval (for example, 1 second). Further, the trigger signal from the outside of the timekeeping unit 46 includes a first trigger signal that causes the timekeeping unit 46 to start outputting the timer signal and a second trigger signal that causes the timekeeping unit 46 to end the output of the timer signal.

The learning control unit 42 causes the robot 10 to perform work by outputting an operation force to the robot 10 via the switching device 30 using the model constructed by machine learning. Hereinafter, the operation force output by the control unit 40 (learning control unit 42) may be referred to as "calculation operation force". Hereinafter, the method of constructing this model will be specifically described. In this embodiment, the output of the calculation operation force is switched every second (that is, the time interval of the timer signal of the timekeeping unit 46).

Figure 2:
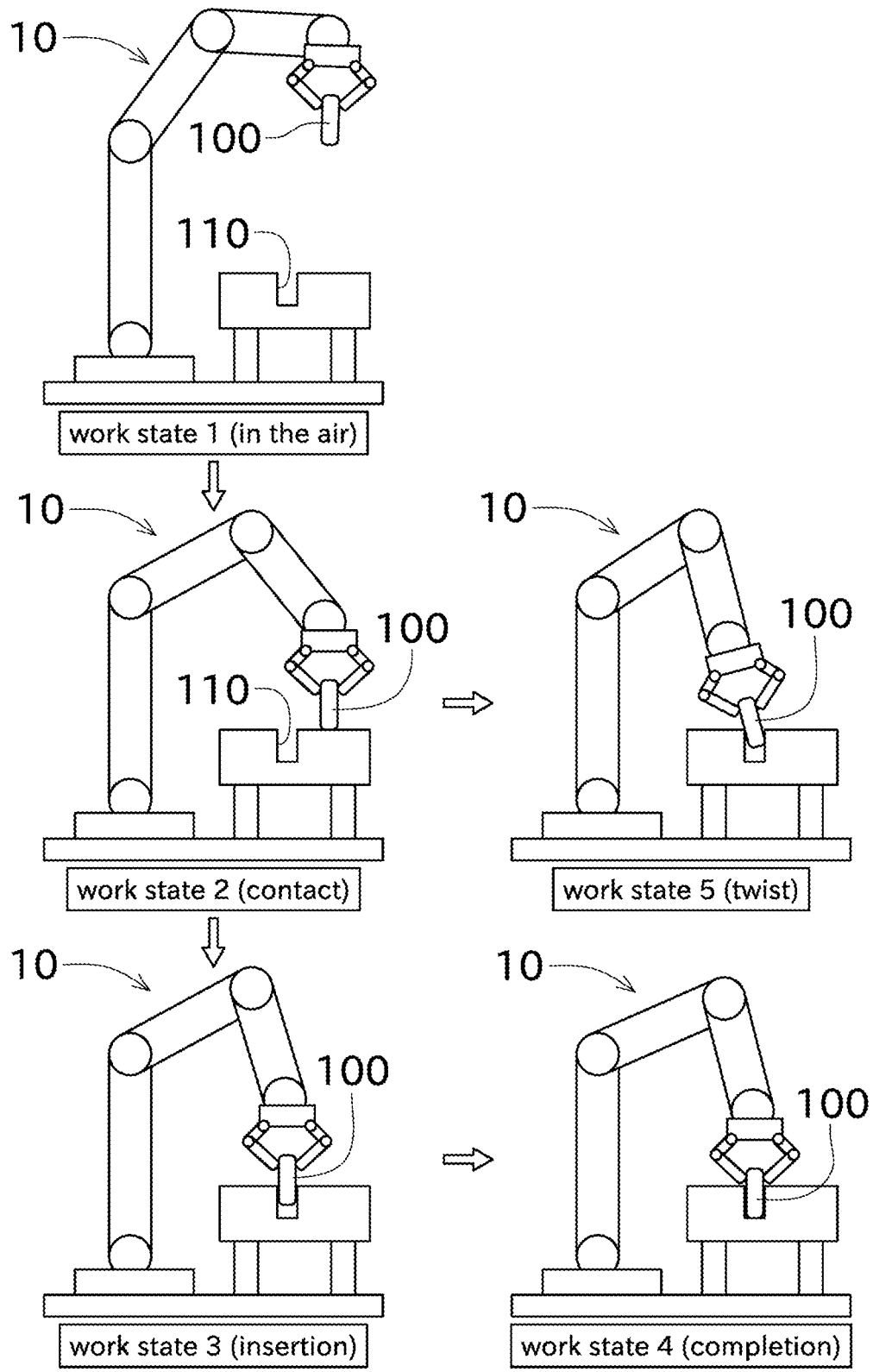
FIG. 2 is a diagram showing a work flow and a work state performed by a robot.

As shown in FIG. 2, when the robot 10 is allowed to perform the work of inserting the workpiece 100 into the recess 110, it can be classified into four work states, for example, in the air, contact, insertion, and completion. The work state 1 (in the air) is a state in which the robot 10 holds the workpiece 100 and positions it above the recess 110. The work state 2 (contact) is a state in which the workpiece 100 held by the robot 10 is in contact with the surface on which the recess 110 is formed. The work state 3 (insertion) is a state in which the workpiece 100 held by the robot 10 is inserted into the recess 110. The work state 4 (completion) is a state in which the workpiece 100 held by the robot 10 is completely inserted into the recess 110. In this way, the four work states are a series of work by the robot 10 classified for each process, and when the work of the robot 10 proceeds correctly, the work state 1 (in the air), the work state 2 (contact), and the work state. The work state changes in the order of state 3 (insertion) and work state 4 (completion). In addition, there is a work state 5 (twist) as another work state. The work state 5 (twist) is not registered as a work state at the stage of first machine learning. In the work state 5 (twist), the workpiece 100 is inserted into the recess 110, but the insertion cannot be further advanced. In the work state 5 (twist), the work cannot be continued unless the work state change into work state 1 (in the air), that is, it is necessary to separate the workpiece 100 from the recess 110.

Next, the data that the learning control unit 42 performs machine learning will be described. The learning control unit 42 performs the machine learning of the current work state, the next work state associated with the current work state (that is, the work state to be transitioned to next), and at least one set of state value and the operation force associated with the state value. The state value is a value indicating the progress of the work of the robot 10, and is a value that changes according to the progress of the work. The state value includes sensor information (for example, work status such as position, speed, force, moment, image, etc.) detected by the state detection sensors 11 to 13. The state value may include information calculated based on the sensor information (for example, a value indicating a change over time of the sensor information from the past to the present).

Figure 4:
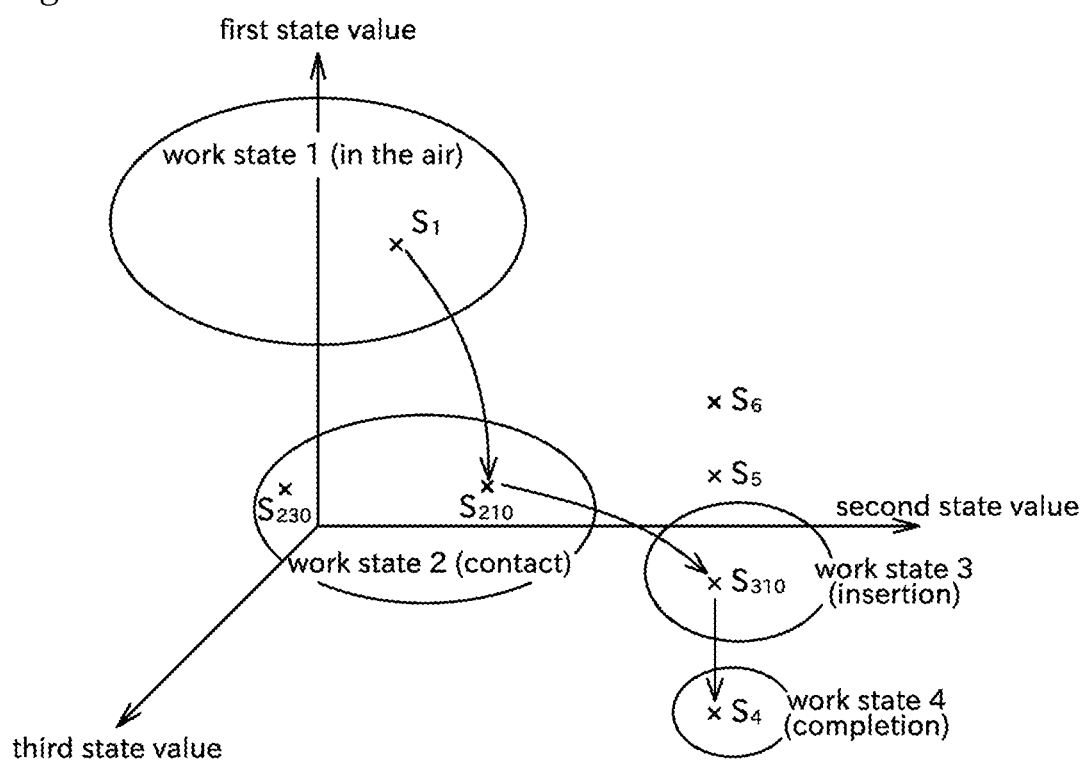
FIG. 4 is a diagram conceptually showing an example of correspondence between a state value and a work state in a model.

FIG. 3 is a diagram showing an example of data that the learning control unit 42 performs machine learning. FIG. 4 is a diagram conceptually showing an example of the correspondence between the state value and the work state in the model. As shown in FIGS. 3 and 4, the current work state is work state 2 (contact) and the current state value is $S_{210}$. Then, the learning control unit 42 performs the machine learning of the operation of the robot 10 for n seconds (n is an integer of 1 or more) so that the work state is changed from the work state 2 (contact) into the work state 3 (insertion), in other words, the state value is changed from $S_{210}$ into $S_{310}$. The learning control unit 42 performs the machine learning of the data shown in FIG. 3 and constructs a model. Specifically, the learning control unit 42 performs the machine learning of the current work state 2 (contact), the next work state 3 (insertion), the current state value $S_{210}$, the operation force $I_{210}$, the state value after m seconds $S_{21m}$ (m is integer from 1 to n−1), the operation force after m seconds $I_{21n}$, $I_{null}$ indicating a dummy operation force. As shown in FIG. 3, the current work state 2 (contact) is different from the next work state 3 (insertion), and there are (n+1) sets of state value and operation force, that is, a plurality of sets. The learning control unit 42 may perform the machine learning the time (for example, after 0 to n seconds) with the state value at the time (for example, $S_{210}$ to $S_{21n}$) and the operation force (for example, $I_{210}$ to $I_{null}$) at the time. The learning control unit 42 may perform the machine learning in which a order of the machine learning is equal to the order of the output and omit the machine learning of the time. The learning control unit 42 may be configured to perform the machine learning of values except the state value after n seconds $S_{21n}$ and the $I_{null}$ indicating the dummy operation force. The operation force to be learned may be an operator operation force output by the operation unit 20 (operation device 21), or may be prepared in advance as data.

There are various operations of the robot 10 for changing the work state 2 (contact) into the work state 3 (insertion). For example, the operation of the robot 10 in which the current state value is $S_{220}$ indicating the work state 2 (contact) and the state value $S_{310}$ indicating the work state 3 (insertion) is also included. In this embodiment, the learning control unit 42 also perform the machine learning of such a operation of the robot 10 and constructs the model. Since the method of machine learning is the same as the method described above with reference to FIG. 3, detailed description thereof will be omitted.

The learning control unit 42 also constructs the model by performing the machine learning of the operation of the robot 10 for changing the work state 2 (contact) into the work state 3 (insertion) and the operation for changing the work state 3 (insertion) into the work state 4 (completion). Since the method of machine learning is the same as the method described above with reference to FIG. 3, detailed description thereof will be omitted. When the current work state is the work state 4 (completion), the robot 10 does not need to operate. In this case, the learning control unit 42 may perform the machine learning of the current work state 4 (completed), the next work state 4 (completed), the state value after 0 second (that is, the current) $S_4$, and the dummy operation force $I_{null}$.

The learning control unit 42 performs, based on the constructed model, a work state estimation process for estimating the current work state from the current state, a next work state estimation process for estimating the next work state from the current state value and the estimated current work state, and an output process for determining the operation force (the calculation operation force) to be output based on the current state value, the estimated current work state, and the next work state and outputting the calculation operation force to the switching device 30. As a result, the learning control unit 42 can control the operation of the robot 10 so as to properly perform the work.

First, the estimation of the current work state (work state estimation process) will be described. As described above, the learning control unit 42 perform the machine learning of the state value and the work state (and the next work state), and estimates the current work state (and the next work state) based on the current state value. As shown in FIG. 4, there are three state values and state values (corresponding to points in FIG. 4) which are learned are distributed in the model. When the state values are inside the areas (spaces) which are corresponding to each work states shown in FIG. 4, there is high probability that the state values indicates the work state corresponding to the specific work state corresponding to the areas. For example, the area of "work state 2 (contact)" indicates a set (cluster) of state values determined to be work state 2 (contact) among the state values for the machine learning. The set (cluster) is formed by determining the center point of the area of "work state 2 (contact)". The center point of the work state 2 (contact) is determined so that the distance from the center point of the work state 2 (contact) to the coordinates of the point indicating the state value determined to be work state 2 (contact) is equal or less than the first distance. The center point of the work state 2 (contact) is also determined so that the distance from the center point of other work states to the coordinates of the point indicating the state value determined to be work state 2 (contact) is equal or more than the second distance which is larger than the first distance. Therefore, as shown in FIG. 4, when the current state values are $S_{210}$, $S_{310}$, the learning control unit 42 estimates that the current work state is the work state 2 (contact), the work state 3 (insertion), respectively.

Next, the process of estimating the next work state (the next work state estimation process) will be described. As described above, the learning control unit 42 performs the machine learning of the state value, the work state, and the next work state, and estimates the next work state based on the current state value and the estimated current work state. For example, as shown in FIG. 4, the current state value is $S_{210}$, and the current work state is estimated to be work state 2 (contact). As shown in FIG. 3, when the current state value during the machine learning is $S_{210}$ and the current work state is work state 2 (contact). The next work state is work state 3 (insertion) (that is, the work state is changed from the work state 2 (contact) to the work state 3 (insertion)). The learning control unit 42 performs the machine learning of the above operation of the robot 10. In this case, the learning control unit 42 estimates that the next work state is the work state 3 (insertion).

Next, a process (output process) for determining and outputting the calculation operation force will be described. As described above, the learning control unit 42 performs the machine learning of the work state, the next work state, the state value, and the operation force, and determines the calculation operation force to the switching device 30 based on the current work state, the next work state, and the current state value. For example, as shown in the FIG. 4, the current state value is $S_{210}$, the current work state is estimated to be work state 2 (contact), and the next work state is estimated to be work state 3 (insertion). FIG. 4 shows an arrow extending from the state value $S_{210}$ to the state value $S_{310}$. The arrow corresponds to the operation for n seconds of the robot 10 for change the work state from the work state 2 (contact) shown in FIG. 3 to the work state 3 (insertion), the learning control unit 42 of the robot 10 performing the machine learning. In this case, the learning control unit 42 outputs a trigger signal to the timekeeping unit 46 when the first operation force $I_{210}$ as an calculation operation force shown in FIG. 3 is output to the switching device 30. The timekeeping unit 46 outputs a timer signal every second from the time when the trigger signal is input based on the trigger signal. Next, the learning control unit 42 outputs the operation forces $I_{210}$ to $I_{21\ (n-1)}$ as a calculation operation force shown in FIG. 3 to the switching device 30 every second based on the timer signal from the timekeeping unit 46. When the learning control unit 42 detects that the operation force shown in FIG. 3 is $I_{null}$ indicating a dummy operation force, the learning control unit 42 stops the output of the calculation operation force.

As described above, the learning control unit 42 determines the calculation operation force for operating the robot 10 from the current state value based on the model constructed by the machine learning. As a result, the learning control unit 42 can operate the robot 10 according to the current work state and by using a more appropriate calculation operation force according to the next work state. Further, even if there are variations in the shape of the workpiece 100, variations in the holding position of the workpiece 100, variations in the positions of the recesses 110, etc., the learning control unit 42 repeats the above-mentioned machine learning so that the robot 10 can flexibly deal with these variations.

Figure 5:
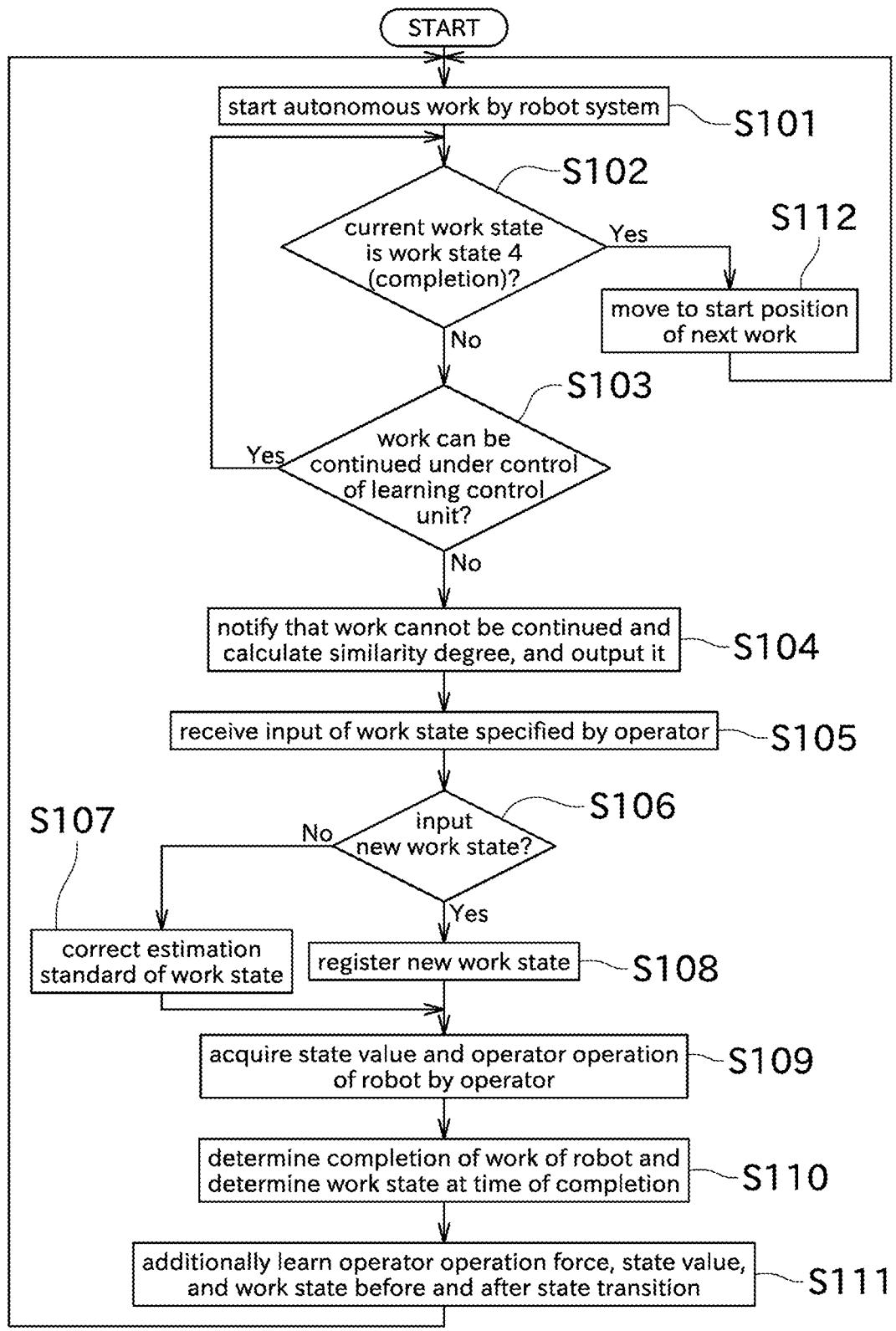
FIG. 5 is a flowchart showing a process performed by the robot system regarding additional learning.

The additional learning unit 43, the determination unit 44, and the notification unit 45 have a function for performing additional learning to be performed when the above machine learning cannot deal with the situation. Hereinafter, this additional learning will be described with reference to FIGS. 5 to 7. FIG. 5 is a flowchart showing a process performed by the robot system regarding additional learning. FIGS. 6 and 7 are diagrams conceptually showing the contents of the additional learning according to the determination result of the work state in the model.

In the present embodiment, when the robot system 1 cannot perform the work autonomously, the operator operates the robot 10 to assist the work, and the model is additionally learned by the operation contents of the assisted operator. Hereinafter, a specific description will be given. In the present embodiment, the operation content of the operator is additionally learned every second (that is, the time interval of the timer signal of the timekeeping unit 46).

First, the learning control unit 42 operates the robot 10, and the autonomous work by the robot system 1 is started (S101). Before the start of the work, the learning control unit 42 outputs a setting signal to the switching device 30 indicating that the calculation operation force is to be converted. The switching device 30 converts the calculation operation force output from the learning control unit 42 to the operation command and output the operation command to the robot 10.

While the learning control unit 42 is controlling the robot 10 (that is, only the calculation operation force is output to the switching device 30), the learning control unit 42 determines that the current work state corresponds to the work state 4 (completion) or not based on the current state value (S102, work state estimation process). When the current work state corresponds to the work state 4 (completed), the learning control unit 42 determines that the work has been completed. Then, the learning control unit 42 outputs the calculation operation force to the switching device 30 for moving the arm portion of the robot 10 to the start position of the next work (for example, the place where the next workpiece 100 is placed). The switching device 30 converts the calculation operation force to the operation command and outputs the operation command to the robot 10 (S112).

When the current work state is not work state 4 (completed) (that is, when the work is not completed), the determination unit 44 determines whether or not the work can be continued under the control of the learning control unit 42 based on the current state value. The determination unit 44 outputs a determination result indicating whether or not to continue (S103, determination step). In other words, the determination unit 44 determines whether or not the work can be continued without the assistance of the operator based on the current state value. This determination is made based on, for example, the current state value (for example, sensor information), preset conditions, or the like. Specifically, the conditions are set such that the force detected by the force sensor 12 suddenly increases, the force detected by the force sensor 12 exceeds the reference value, or the like. Further, the determination unit 44 may make an autonomous determination (in other words, create a determination reference or a condition by itself) instead of the preset conditions. Specifically, the determination unit 44 receives the output of a similarity degree of the work state described later from the learning control unit 42, and the current state value does not belong to any work state based on the similarity degree (for example, When it is determined that the similarity degree is lower than a predetermined threshold value in any work state), it is determined that the work cannot be continued.

When the determination unit 44 outputs the determination result indicating that the work of the robot 10 can be continued under the control of the learning control unit 42, the learning control unit 42 subsequently outputs the calculation operation force to the switching device 30 and operate the robot 10. On the other hand, when the determination unit 44 outputs the determination result indicating that the work of the robot 10 cannot be continued under the control of the learning control unit 42, a process for requesting the assistance of the operator and performing additional learning is performed. In order to perform the additional learning, the current correct work state and the next work state, the state value, and the operation force for resolving the state in which the work cannot be continued are required.

Specifically, the notification unit 45 notifies that the work cannot be continued based on the determination result indicating that the work of the robot 10 cannot be continued. Specifically, the notification unit 45 outputs a first notification signal indicating that the work cannot be continued to the display device 22, and the learning control unit 42 provides the similarity degree as an information for the operator to identify the current correct work state. The notification unit 45 outputs the second notification signal for displaying the similarity degree to the display device 22 (S104, notification step). The similarity degree is a value indicating the degree to which the current state value is similar to the (registered) work state in the model. The similarity degree is calculated by comparing the current state value with the distribution of the state values belonging to each work state in the model (that is, learned state values belonging to each work state). To explain by way of example, in a situation where areas of work states 1 to 4 exist as shown in the upper graph of FIG. 6, the current state values $S_5$, $S_6$ are outside from these areas. The learning control unit 42 calculates the similarity degree based on the distance between the coordinates indicating the current state values $S_5$, $S_6$ and the center points of the areas of the work states 1 to 4 (or the work states 1 to 4). The similarity degree increases as the distance becomes shorter. The learning control unit 42 may calculate the similarity degree for each state value, or may calculate one similarity degree in consideration of the comparison results of all the state values. The learning control unit 42 may calculate and output the similarity degree to all the registered work states, or may output only the similarity to one work state having the highest similarity. The similarity degree is displayed on the display device 22 as text data, but may be displayed on the display device 22 using a figure such as a graph, for example.

Next, the control unit 40 performs a process for receiving the input of the work state specified by the operator (S105, input receiving process). For example, the control unit 40 (notification unit 45) transmits a third notification signal to the display device 22 so that the display device 22 displays an input field for the operator to input the correct work state using the input unit 23. As a result, it is possible to prompt the operator to identify the work state and input the work state. Before or after the process of step S105, the control unit 40 outputs the setting signal to the switching device 30 indicating that the operator operation force is to be converted. The switching device 30 changes the setting so that the operation command which is converted from the operator operation force output by the operation unit 20 (operation device 21) is output. The setting of the switching device 30 may be changed when the display device 22 displays the input field or before that (for example, when the determination unit 44 outputs a determination result indicating that the work of the robot 10 cannot be continued). preferable. As a result, the operator can be able to input after confirming the display of the display device 22, and the operation command based on the operator operation force can be reliably output to the robot 10.

The operator confirms the similarity degree displayed on the display device 22 and identifies the correct work state by visually recognizing the positional relationship between the robot 10, the workpiece 100, and the recess 110 directly or through a camera. The operator may specify the correct work state by operating the operation device 21 to operate the robot 10 or by directly touching the robot 10 by hand. As described above, the operator identifies the correct work state (for example, the work state 3 which is the work state in the model) and inputs by using the input unit 23 of the operation unit 20. If none of the work states in the model is applicable, the operator creates a new work state (for example, a work state 5 that is not the work state in the model) and inputs it by the input unit 23 of the operation unit 20.

When the control unit 40 (additional learning unit 43) determines that the work state in the model has been input by using the input unit 23 (S106). The control unit 40 acquires the current state value and corrects the state estimation standard in the model based on the state value (S107, work state estimation standard correction step). To explain with an example, as shown in the upper graph of FIG. 6, in a situation where areas of the work states 1 to 4 exist in the model, the current state values $S_5$ outside these area is determined to corresponds to the work state 3 (insertion). In this case, as shown in the lower graph of FIG. 6, the additional learning unit 43 modify the work state 3 (injection) so that the coordinates indicating the current state value $S_5$ are located within the area of the work state 3 (insertion). For example, the additional learning unit 43 is in the area of the work state 3 (insertion) in the model so that the coordinates of the point indicating the current state value $S_5$ or the coordinates close to it can be easily determined as the work state 3 (insertion). Correct the center point and/or the first distance.

On the other hand, when the control unit 40 (additional learning unit 43) determines that a new work state different from the work state in the model has been input to the input unit 23 (S106). The control unit 40 acquires the current state value and registers a new work state in the model based on the state value (S108, work state registration step). To explain with an example, as shown in the upper graph of FIG. 7, in a situation where areas of work states 1 to 4 exist in the model, the current state values $S_6$ outside these areas. It is determined that the operator has input to the input unit 23 that it corresponds to the work state 5 (twist) which is a work state different from the existing work states 1 to 4. In this case, as shown in the lower graph of FIG. 7, the additional learning unit 43 is set to add the work state 5 (twist), which is a new work state, to the model. At this stage, since there is only one coordinate point associated with the work state 5 (twist), the additional learning unit 43 add the area in which the predetermined distance, which corresponds to the first distance as other work states, from the (center) point indicating the current state value $S_6$ to the area of the work state 5 (twist) in the model.

Next, the operator operates the operation unit 20 (operation device 21). The operation unit 20 outputs the operator operation force to the switching device 30, and the switching device 30 converts the operator operation force into an operation command and outputs the output to operate the robot 10. For example, when the operator inputs to the input unit 23 that the current work state is the work state 3 (insertion), the operator operates the operation device 21 to operate the robot 10 to insert the workpiece 100 and transitions the work state into the work state 4 (completed), that is, to complete the work. When the operator inputs to the input unit 23 that the current work state is the new work state 5 (twist), the operator operates the robot 10 to operate the work by operating the operation device 21 and moves upward to be separated from the recess 110, and the work state 5 (twist) is changed to the work state 1 (in the air).

At this time, the operation unit 20 outputs the operator operation force in which the operator operates the robot 10 so as to change the work state to the control unit 40 (additional learning unit 43), and the additional learning unit 43 acquire the operator operation force and state values (S109). For example, when the additional learning unit 43 detects that the operator operation force is input from the operation unit 20, the additional learning unit 43 outputs a trigger signal to the timekeeping unit 46. Based on the trigger signal, the timekeeping unit 46 outputs a timer signal at a predetermined time interval (1 second in the present embodiment) from the time when the trigger signal is input. Next, the additional learning unit 43 acquires the current state value (for example, sensor information is acquired from the state detection sensors 11 to 13), and acquires the operator operation force from the operation unit 20. The additional learning unit 43 stores an index having a numerical value of 0, the state value, and the operation force (that is, the operator operation force) in association with each other. The additional learning unit 43 acquires the state value and the operator operation force every second based on the timer signal every second from the timekeeping unit 46. The additional learning unit 43 increments the index by 1 stores the index, the state value, and the operation force (operator operation force) until the completion of the operation of the robot 10 by the operation of the operator.

The additional learning unit 43 determines whether the operation of the robot 1 by the operation of the operator and determines the work state of completion of the work (that is, the work state after transitioning the state based on the acquired state value (S110, state transition completion determination step). For example, the determination that the operation of the robot 10 is completed is determined by the additional learning unit 43, based on the index, the state value, and the operation force stored in association with each other, for a certain period of time or more since the state value does not change. What has been done (that is, the same state value is continuously stored a certain number of times or more), or a certain number of times have passed since the output of the operator operation force disappeared (that is, there is no operation force a certain number of times). It may be performed by detecting that the above is continuously stored). At this time, the additional learning unit 43 may determine that the time when the operation of the robot 10 by the operation of the operator is completed is the first time when the state value does not change (for example, the same state value is continuously stored a certain number of times or more). The additional learning unit 43 may determine that the time when the operation of the robot 10 by the operation of the operator is completed is the first time when the output of the operator operation force disappears (for example, the youngest index when the lack of operation force is continuously stored for a certain number of times or more). Preferably, the additional learning unit 43 replaces the operation force associated with the time of the completion of the operation of the robot 10 by the operation of the operator (that is, the youngest index) with $I_{null}$ indicating the dummy operation force and overwrites the dummy operation force. Regarding the determination of the work state of the completion of the operation, for example, the additional learning unit 43 calculates the state value associated with the time of completion of the operation of the robot 10 by the operation of the operator based on the index, the state value, and the operation force. The control unit 40 (additional learning unit 43) performs the process for estimating the work state (work state estimation process).

The additional learning unit 43 additionally learns the acquired operator operation force, the state value, and the work state before and after the state transition (S111, additional learning step). The work state before the state transition is a work state in which the operator inputs to the input unit 23 and outputs to the additional learning unit 43 in steps S105 to S107. For example, in step S106, when the state value is $S_5$, the current work state (work state before the transition) is input as the work state 3 (insertion). In step S109, the operator continues to insert the workpiece 100 and completes the work, then in the step S110, the additional learning unit 43 identifies that the work state has transitioned from the work state 3 (insertion) to the work state 4 (completion) and determines that the state value after the state transition is calculated to be $S_4$. The additional learning unit 43 creates the data for additional learning shown in FIG. 8, which is corresponding to the operation of the robot 10 for p seconds (p is an integer of 1 or more) and additionally learns it and updates the model. Since the method of additional learning is the same as the method of machine learning described above with reference to FIG. 3, detailed description thereof will be omitted. By performing this additional learning, the learning control unit 42 acquires a new method for advancing the insertion of the workpiece 100. As a result, even if the same kind of situation occurs from the next time onward, the work can be continued without the assistance of the operator.

Further, when the state value is $S_6$, the current work state (work state before the transition) is input as a new work state 5 (twist) in step S106. Then, the operator moves the workpiece 100 so that the workpiece 100 separates from the the recess 110 in step S109. Then, the additional learning unit 43 identifies that the work state has changed from the work state 5 (twist) to the work state 1 (in the air) and the state value after state transition is calculated to be the state value $S_1$ in step S110. Then, the additional learning unit 43 creates the data for additional learning shown in FIG. 9, which is corresponding to the operation of the robot 10 for q seconds (q is an integer of 1 or more) and additionally learns it and updates the model. Since the method of additional learning is the same as the method of machine learning described above with reference to FIG. 3, detailed description thereof will be omitted. By performing this additional learning, the learning control unit 42 acquires a method for resolving the twist when the twist occurs. As a result, even if the same kind of situation occurs from the next time onward, the work can be continued without the assistance of the operator.

When the additional learning unit 43 completes the additional learning (S111), the learning control unit 42 operates the robot 10 and restarts the autonomous work by the robot system 1 (S101). Here, before returning to the process of step S101, the control unit 40 outputs a setting signal indicating that the calculation operation force is to be converted to the switching device 30, so that the switching device 30 outputs the calculation output by the learning control unit 42. The setting of the switching device 30 is changed so that the operation command obtained by converting the operation force is output to the robot 10.

As described above, by detecting the state in which the robot system 1 cannot be resolved autonomously and performing additional learning associated with the work state, additional learning can be efficiently performed, so that the robot system 1 is stopped too much. It is possible to continue the work without causing it.

This embodiment can be modified in various ways. In the present embodiment, the robot system 1 additionally learns and outputs the operation of the robot 10 in second order, which is the time interval of the timer signal, but the timer signal may have a shorter time interval (for example, 0.1 second or less). The robot system 1 may be configured so that the operation of the robot 10 can be additionally learned and output even if the time interval is such a short time. As a result, the operation of the robot 10 can be additionally learned with higher accuracy, and the robot 10 can be operated with higher accuracy.

In the present embodiment, the timekeeping unit 46 outputs the timer signal every second from the time when the trigger signal is received based on the trigger signal, and the control unit 40 additionally learns the operation of the robot 10 based on the timer signal or operates the robot 10. When the robot system 1 is configured so that the operation of the robot 10 can be additionally learned and output even if the timer signal has a shorter time interval (for example, a time interval of 0.1 second or less), the timekeeping unit 46 may be configured to always output a timer signal at this short time interval, not based on the trigger signal. As a result, the configuration of the timekeeping unit 46 can be simplified without additionally learning the operation of the robot 10 and lowering the accuracy of the operation of the robot 10. Specifically, if the timekeeping unit 46 is configured to constantly output the timer signal at a predetermined time interval, a delay of the time interval occurs at the maximum in the additional learning and output of the operation of the robot 10 based on the timer signal. When the timekeeping unit 46 outputs a timer signal at 1 second intervals as in the present embodiment, a delay of 1 second at the maximum occurs, so that the influence of the delay cannot be ignored. On the other hand, when the output time interval of the timer signal is a short time interval such as 0.1 second or less (that is, when the robot system 1 can process the additional learning and output of the operation of the robot 10 in substantially real time), the effect of the above delay is minor.

In the present embodiment, the number of work states is at most 5, but the number of work states may be increased. This makes it possible to determine a more appropriate work state corresponding to the current state value.

In the present embodiment, in step S105, the input unit 23 receives the input of the current work state by the operator and outputs it to the additional learning unit 43, but the input unit 23 may receive and output the input of the next work state. For example, a key (not shown) may be provided so that the additional learning unit 43 may receive the next work state. As a result, in step S110, the identification of the work state after the transition performed by the additional learning unit 43 can be omitted.

In the present embodiment, the work state transitions from the work state 2 (contact) to the work state 3 (insertion), but the work state is not limited to this, and the work state may be changed from the work state 2 (contact) to the work state 1 (in the air). This makes it possible to determine a more appropriate transition of the work state. For example, as shown in FIG. 4, there is a case where the current work state is work state 2 (contact) and the current state value is $S_{230}$. The area of work state 3 (insertion) is far from the current state value $S_{230}$, and the area of work state 1 (in the air) is close to it. In such a case, the operation of the robot 10 that transitions the work state from the current state value $S_{230}$ to the work state 3 (insertion) may be learned, but the state value is changed to $S_1$ by moving the workpiece 100 upward. It is better to operate the robot 10 so that the workpiece 100 is further moved and the state value is changed to $S_{210}$ after changing to (that is, transitioning to the work state 1 (in the air)). Which operation is more appropriate may be evaluated by, for example, the time until the operation of the robot 10 is completed (that is, until the work state 4 (completion) is reached).

In the present embodiment, the switching device 30 includes a switching unit 31 and a conversion unit 32, but the configuration of the switching device 30 is not limited to this. For example, the switching device 30 may be provided with a regulatory unit which controls so that outputting the operation command of the conversion unit 32 is stopped based on the force received by the robot 10 detected by the force sensor 12 and the operation force input to the conversion unit 32. As a result, the operation of the robot 10 can be regulated when an unexpected situation occurs. For example, when the regulatory unit determines that the detection value of the force sensor 12 is equal to or higher than the threshold value and the operator operation force or the calculation operation force is equal to or higher than the threshold value and the detection value of the force sensor 12 continues to increase in the same direction, the regulatory unit controls to stop the output of the operation command from the conversion unit 32.

In the present embodiment, before and after the process of step S105 (for example, when the determination unit 44 outputs a determination result indicating that the work of the robot 10 cannot be continued), the control unit 40 uses the switching device 30 to operate the operator. Then, in step S110 and S111, when the additional learning is determined to be completed, the control unit 40 modifies the setting so that the switching device 30 outputs the operation command. The control unit 40 (learning control unit 42) may interrupt the output of the calculation operation force instead of changing the setting so that the switching device 30 outputs the operation command converted by the operator operation force, and the control unit 40 may restart the output of the calculation operation force instead of changing the setting so that the switching device 30 outputs the operation command converted by the calculation operation force. As a result, when the work of the robot 10 cannot be continued under the control of the learning control unit 42, it is possible to suppress the risk of unnecessary operation of the robot 10 due to the calculation operation force.

Next, the second embodiment will be described with reference to FIGS. 10 to 15. In the description of the second embodiment, the same or similar members as those in the first embodiment may be designated by the same reference numerals in the drawings, and the description may be omitted.

Figure 10:
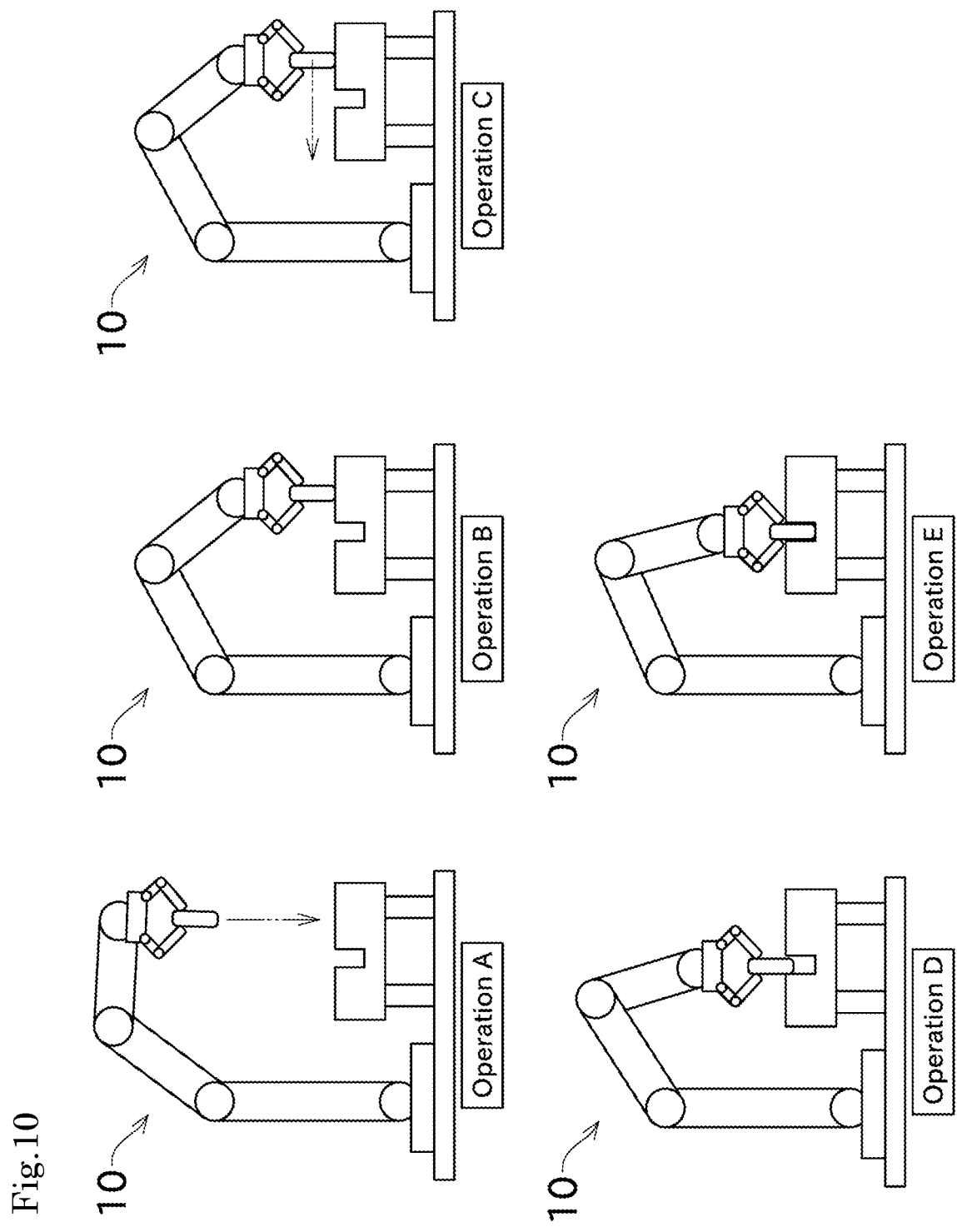
FIG. 10 is a diagram illustrating an operation performed by the robot in the second embodiment.

In the second embodiment, the workpiece performed by the robot 10 is classified into a plurality of operations as shown in FIG. 10. Specifically, in the operation A, the workpiece is positioned above the member while the robot 10 holds the work, and the work is brought close to the surface of the member. In operation B, the workpiece is moved as it is, and the work is brought into contact with the surface of the member. In operation C, the workpiece is moved toward the position of the opening. When the workpiece is moved, the workpiece is maintained in contact with the surface of the member. In operation D, the end of the workpiece is brought into contact with the inner wall of the opening. In operation E, the workpiece is inserted into the opening.

Here, the "work state" described in the first embodiment and the "operation" in the second embodiment are similar concepts. For example, in the second embodiment, it is possible to regard the period during which the operation A is being performed as the work state A and the period during which the operation B is being performed as the work state B (the same applies to the operations C and D).

Figure 11:
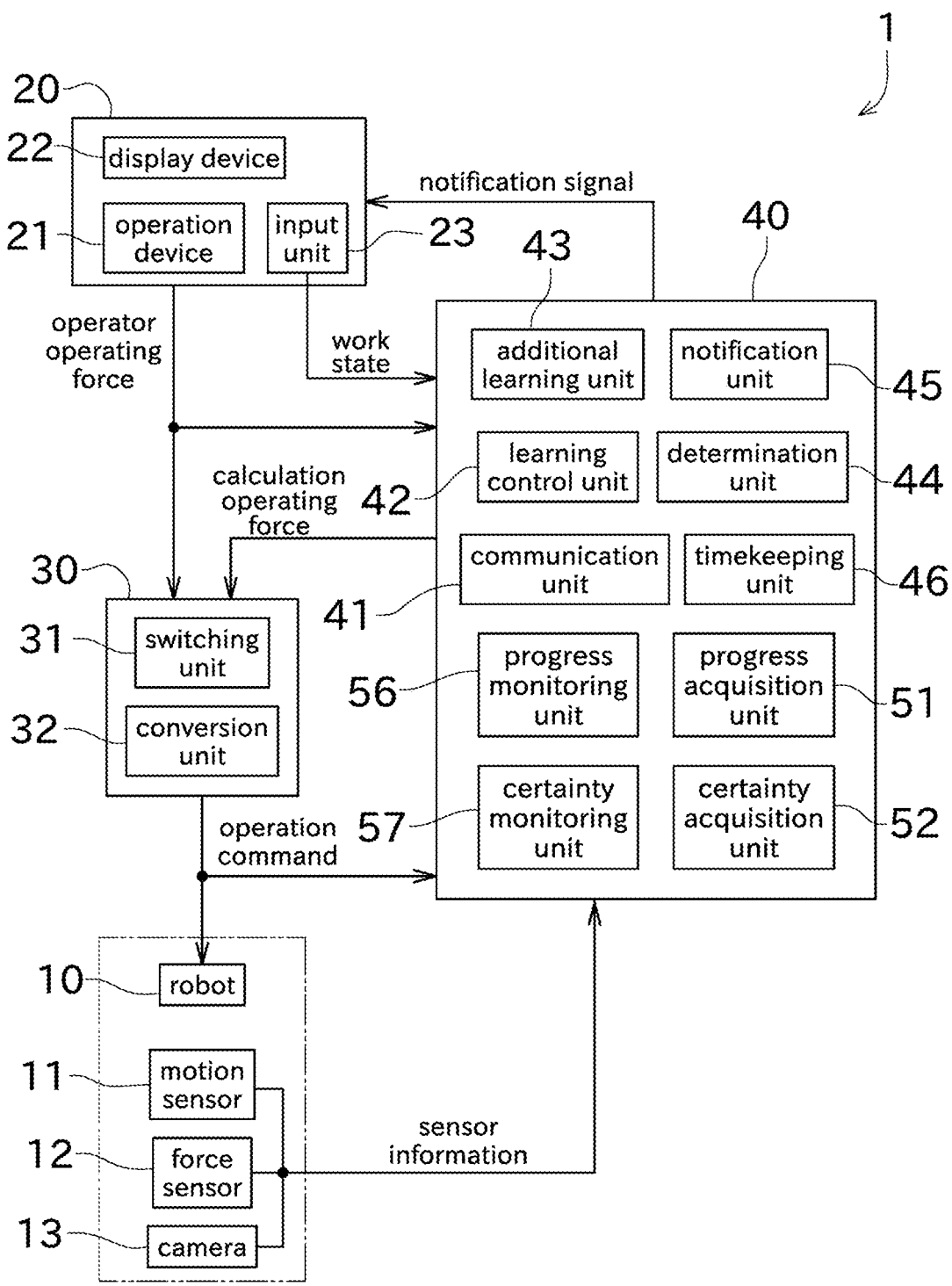
FIG. 11 is a block diagram showing a configuration of a robot system according to a second embodiment.

Next, the robot system 1 of the second embodiment will be described with reference to FIG. 11. The second embodiment is different from the first embodiment in that progress degree and certainty degree are acquired and used. As described in the first embodiment, the control unit 40 can function as various means by reading and executing the program stored in the storage unit by the arithmetic unit. The control unit 40 of the second embodiment further includes a progress acquisition unit 51, a certainty acquisition unit 52, a progress monitoring unit 56, and a certainty monitoring unit 57.

The progress acquisition unit 51 acquires the progress degree. The progress degree is a parameter used to evaluate which degree of progress the movement performed by the robot 10 based on the output of the model constructed by the above-mentioned machine learning (including additional learning) corresponds to in a series of operations. In the present embodiment, the progress degree takes a value in the range of 0 to 100, and the closer it is to 100, the more a series of work is progressing.

Figure 12:
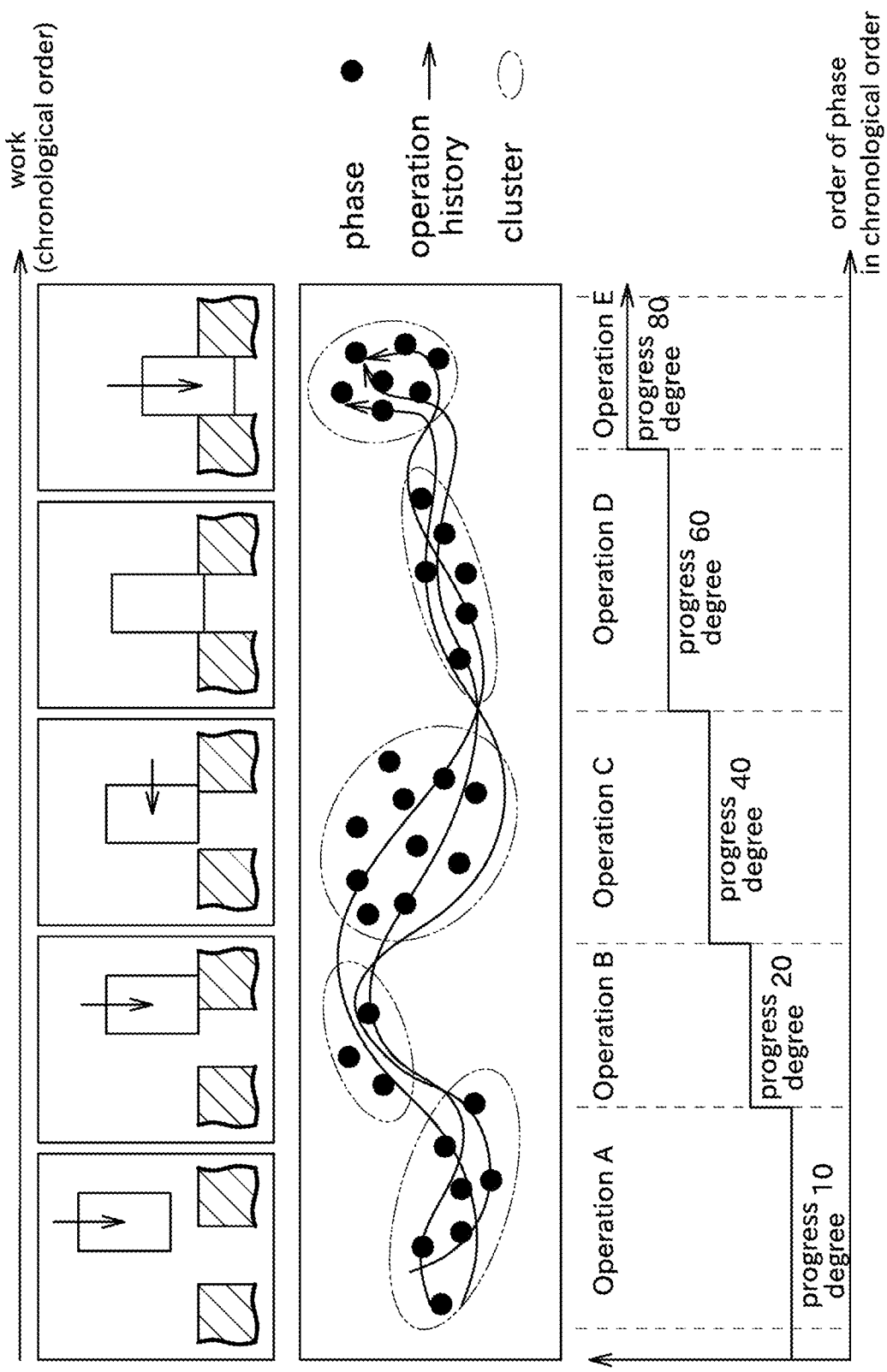
FIG. 12 is a diagram illustrating acquisition of progress degree.

The calculation of the progress degree will be described with reference to FIG. 12. In the present embodiment, as shown in FIG. 12, the progress degree is calculated in consideration of the cluster obtained by clustering the states of the robot 10 that can be acquired in chronological order (time series) and the operation history of the robot 10.

The state of the robot 10 described above can be expressed as a multidimensional vector (feature vector) including the sensor information from the state detection sensors 11 to 13 and the calculation operation force of the model. The feature vector changes variously in the process of the robot 10 performing a series of operations. The feature vector may include not only the value of the sensor information and the calculation operation force at the present time, but also the past history of the sensor information and the calculation operation force.

In the following description, the sum of the state of the robot 10, the state of its surroundings, and the result estimated by the model accordingly may be referred to as a phase of the robot 10. As the feature vector described above, data (phase data) representing the phase of the robot 10 is used. The phase data corresponds to a combination of both the input data (specifically, sensor information) input to the model and the output data (specifically, calculation operation force) output from the model.

Clustering is a type of unsupervised learning, and is a method of learning the law of distribution from a large number of data to acquire a plurality of clusters, which are a group of data having similar characteristics to each other. As a clustering method, a known non-hierarchical clustering method can be appropriately used.

The aspect of the robot 10 is characterized for each of the above-mentioned operations (operations A to E). For example, the characteristics of the state in the operation A (that is, the phase data acquired in the operation A) are different from the characteristics of the state in the operation B. Therefore, by performing appropriate clustering on the above-mentioned feature vectors, the phases of the robot 10 can be classified for each operation.

The learning control unit 42 calculates the progress degree corresponding to the current aspect of the robot 10 by using the above clustering result. As shown in FIG. 12, the value of the progress degree is predetermined so as to gradually and cumulatively increase according to the order of operations indicated by each cluster. Since the series of operations of the robot 10 can be expressed as arranging the feature vectors in chronological order, the chronological order of each cluster can be obtained by using the information in this chronological order.

The learning control unit 42 calculates which cluster the feature vector indicating the current aspect of the robot 10 belongs to, and the learning control unit 42 outputs the progress degree belonged to the cluster by request from the progress acquisition unit 51 or the certainty acquisition unit 52. In order to specify which cluster the feature vector belongs to, for example, the distance between the center of gravity position of each cluster and the feature vector may be obtained, and the cluster having the center of gravity with the shortest distance may be obtained.

Figure 13:
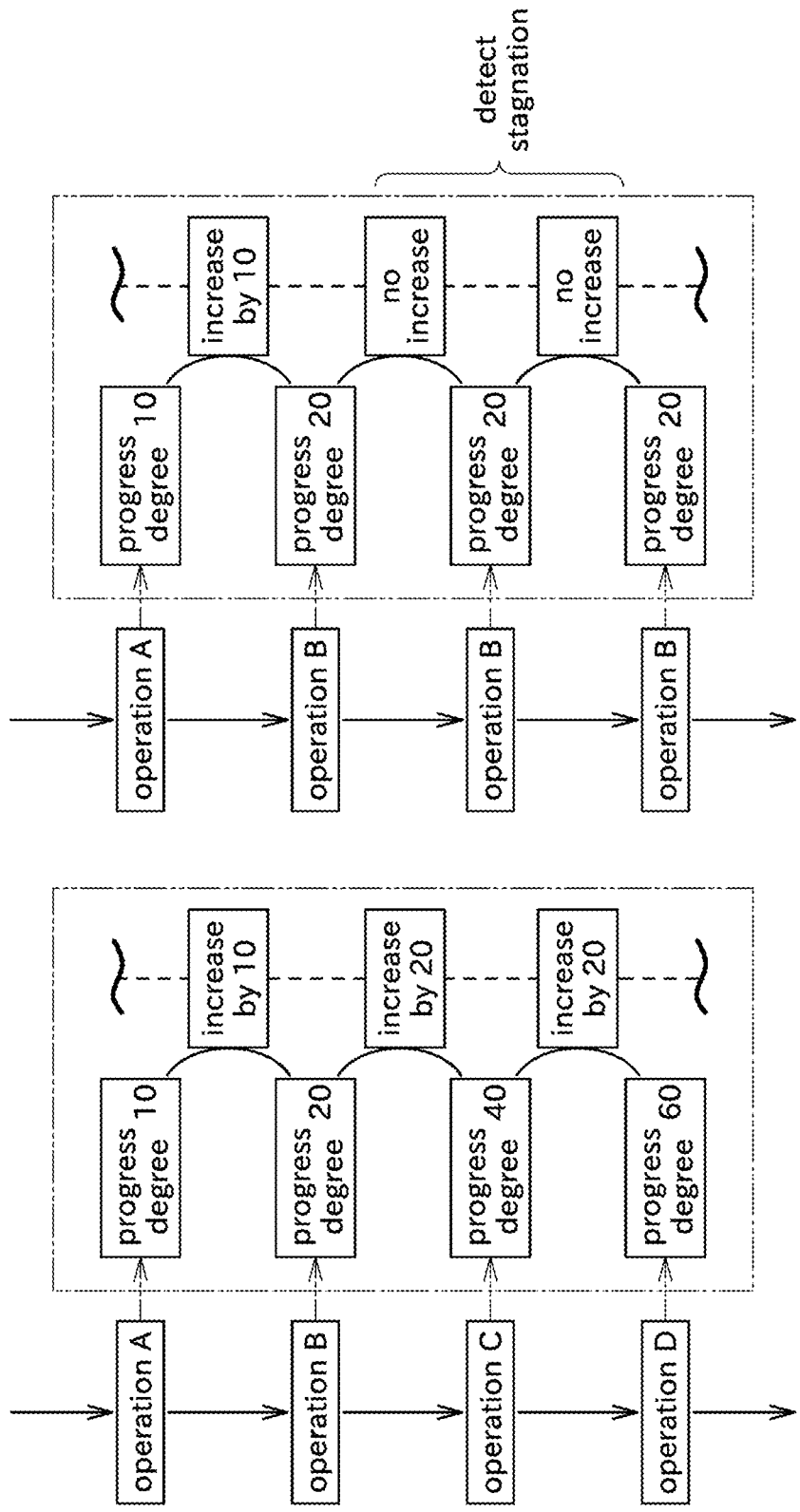
FIG. 13 is a diagram showing an example of a transition of a progress degree value according to a robot operation.

As shown in FIG. 13, when the work of the robot 10 is progressing (that is, when the phase of the robot 10 is appropriately transitioned), the value of the progress degree increases with the passage of time. However, when the work of the robot 10 does not proceed (for example, when the transition to a specific phase is repeated), the value of the progress degree does not increase over time. Therefore, the user can easily grasp whether or not the autonomous work by the robot 10 is progressing by observing the change in the progress degree. As a result, the stagnation of the operation of the robot 10 can be easily found, and appropriate measures such as correction of the operation can be taken.

The certainty acquisition unit 52 acquires the certainty degree. The certainty degree is a parameter used to evaluate whether the operation of the robot 10 is certainty (in other words, whether the output estimated by the model is certainty).

The model of the learning control unit 42 learns in advance the correspondence between the state of the robot 10 and its surroundings and the operator operation force by the user's operation performed at that time. In other words, the model operates on the rules obtained from a number of known states. Due to the generalization ability inherent in machine learning models, it is expected that the model will output appropriate calculation operation force even in unknown situations. However, just as it is difficult for humans to act with certainty when they are placed in a completely new situation that is difficult to predict from past experience, from the standpoint of a model, the known that they have learned so far. It can be said that the farther the state is from the above state, the less confident the estimation result is. In this sense, certainty degree indicates certainty of estimation.

In the present embodiment, the learning control unit 42 is constructed with a stochastic discriminator for discriminating the aspect of the robot 10 by machine learning. A plurality of the stochastic discriminators are provided according to the number of clusters classified by the above-mentioned clustering.

For example, in the stochastic discriminator of the cluster of operation A, when the feature vector classified into the cluster of operation A by clustering is input, a value close to 100 is output and the cluster of other operations is classified. When a feature vector is input, machine learning is performed so that a value close to 0 is output. Therefore, when a feature vector indicating the current phase of the robot 10 is input to the stochastic discriminator for which learning has been completed, the stochastic discriminator outputs a value indicating whether or not the phase is likely to be operation A. It can be said that this value substantially indicates the probability (estimated probability) that the current aspect of the robot 10 is operation A. Learning is performed in the same manner as described above in the stochastic discriminator of other clusters (other operations B to E).

By inputting the feature vector to each of the plurality of stochastic discriminators, it is possible to determine which of the operations A to E the current situation corresponds to, and which estimation is certainty based on the stochastic discriminator.

Figure 14:
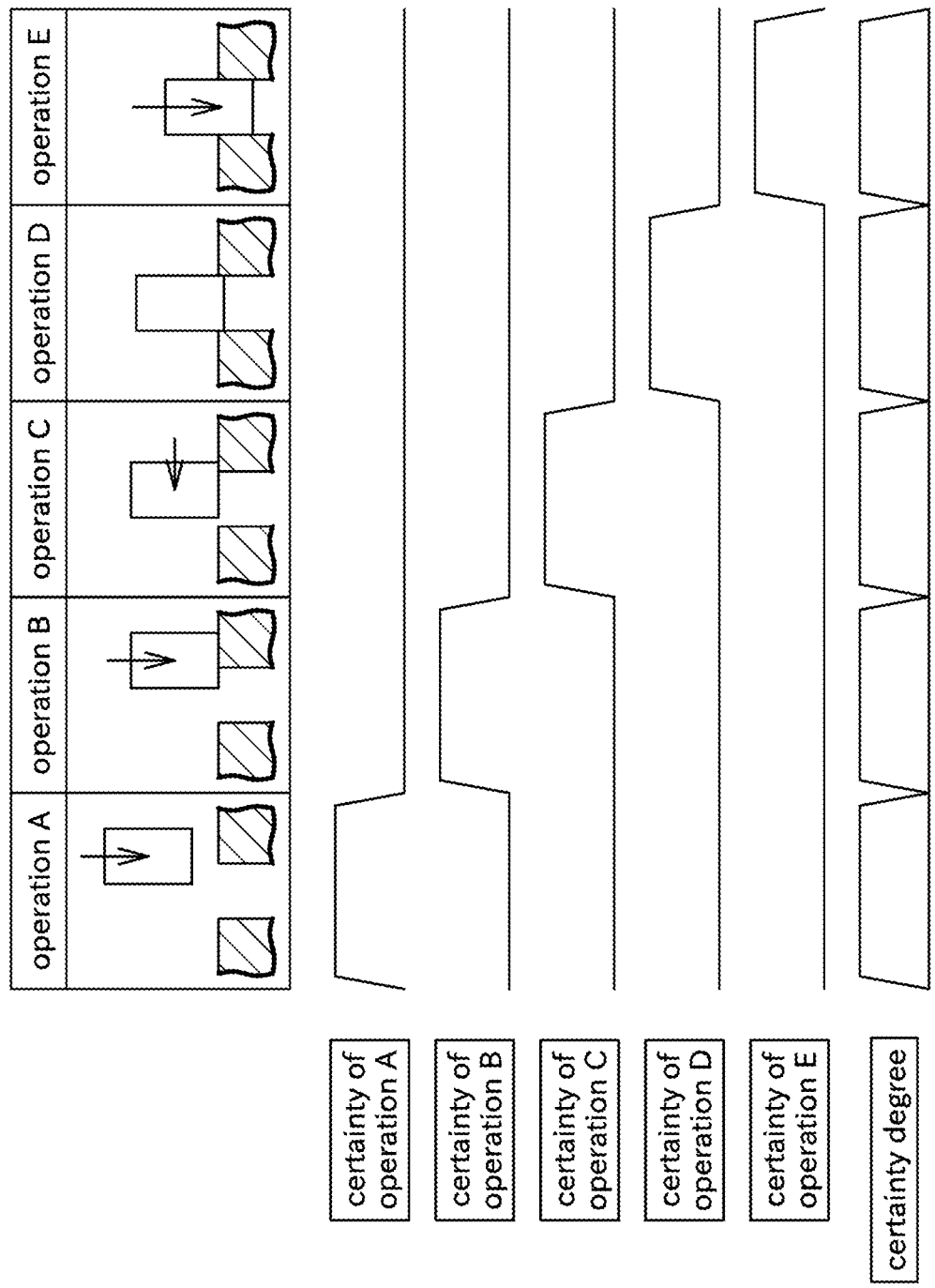
FIG. 14 is a diagram illustrating acquisition of certainty degree.

In the present embodiment, as shown in FIG. 14, the maximum value among the estimated probabilities output by the plurality of stochastic discriminators is used as the certainty degree. If the current aspect is similar to the known aspect of the robot 10 (in other words, the aspect classified into any of actions A to E by clustering), the value of the certainty degree becomes large. On the other hand, if the current aspect is not similar to the known aspect of the robot 10, the value of the certainty degree will be small.

Figure 15:
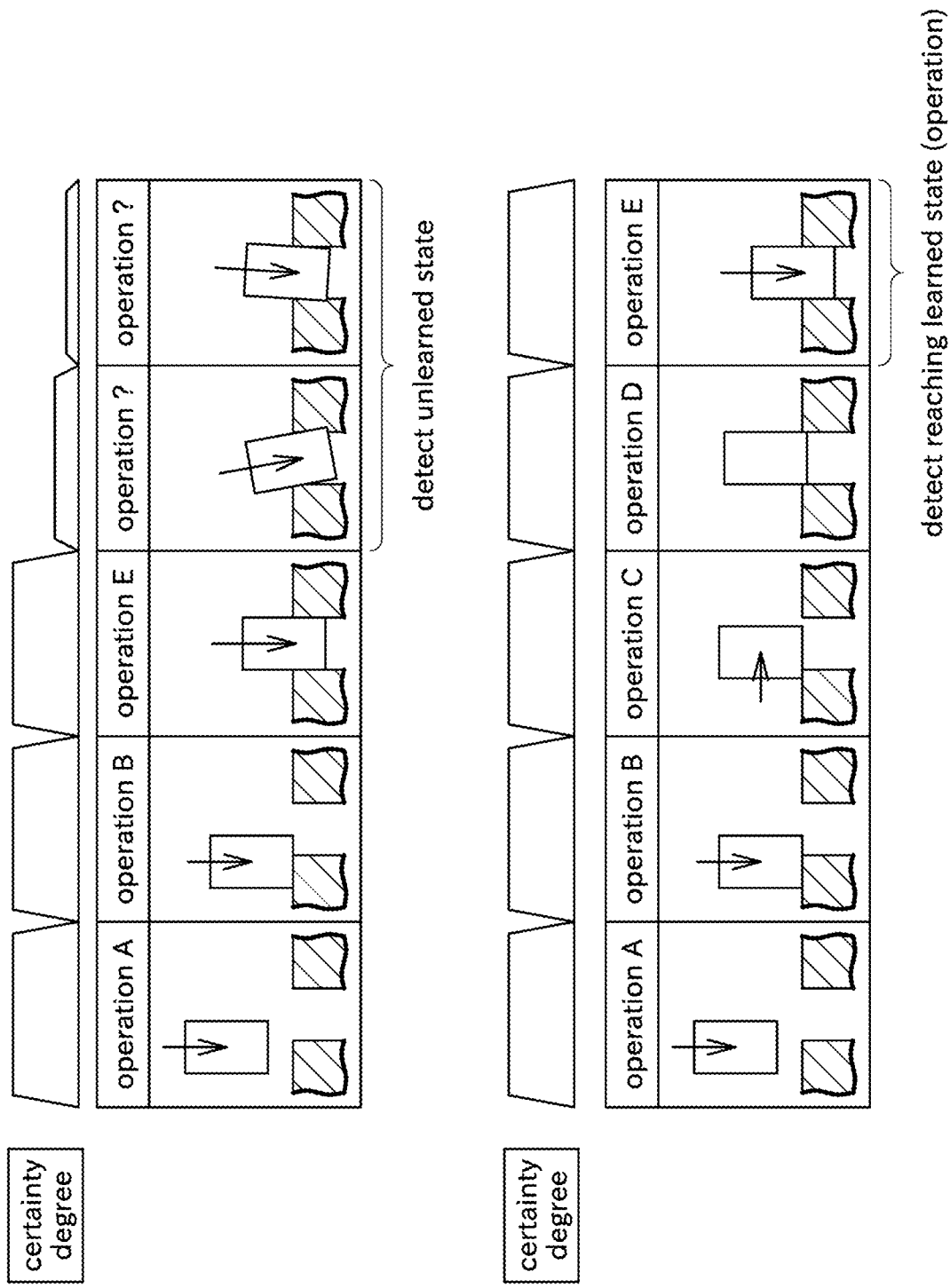
FIG. 15 is a diagram showing an example of a transition of a value of certainty degree according to an operation of a robot.

As shown in FIG. 15, the user can evaluate whether or not the operation of the robot 10 is likely by looking at the value of the certainty degree during a series of operations, for example. That is, if an operation in which the model does not learned is performed, the value of the certainty degree decreases. Therefore, the user can grasp that the series of operations includes an operation that is insufficiently learned. The control unit 40 may automatically detect an operation with a low certainty degree. On the other hand, if the operation in which the model has learned, the value of the certainty degree increases. Therefore, the user can also know that the operation of the robot 10 in a certain aspect matches the learned operation.

The user can also use the value of the certainty degree to confirm that the robot 10 has reached a learned state (for example, any of operations A to E).

The progress monitoring unit 56 monitors the progress degree acquired by the progress acquisition unit 51 described above. As shown in FIG. 13, the progress monitoring unit 56 can detect a situation in which the progress degree does not change for a predetermined time, and can detect a stagnation in the operation of the robot 10.

When the progress monitoring unit 56 detects the stagnation of the operation of the robot 10, the control unit 40 may stop the control of the robot 10 and stop the work by the robot 10. In this case, a time-out function (a function of giving up the continuation of work) based on the monitoring result of the progress monitoring unit 56 can be realized.

In the second embodiment, the determination step (S103) of the first embodiment is performed using this time-out function. Specifically, the determination unit 44 determines that the work cannot be continued under the control of the learning control unit 42 when the time in which the progress degree does not increase output by the progress monitoring unit 56 does not increase for a longer time than the threshold value.

The progress degree is also used in the work state estimation process (S102) of the first embodiment to determine whether or not the work has been completed. Specifically, the learning control unit 42 determines whether or not the current state is the work state corresponding to the operation E and the progress degree is equal to or higher than the threshold value (for example, 100), and when the progress degree is equal to or higher than the threshold value, the work is determined to be completed.

The certainty monitoring unit 57 monitors the certainty degree acquired by the certainty acquisition unit 52. The certainty monitoring unit 57 constantly monitors the value of the certainty degree and detects an operation in which the value of the certainty degree does not reach a predetermined value, as shown in FIG. 15. The certainty monitoring unit also detects similar the current work state is with respect to a preset work state.

The certainty degree can be used in place of the similarity degree of the first embodiment. Therefore, the learning control unit 42 can perform the work state estimation process (S102) of the first embodiment by using, for example, the certainty degree output by the certainty monitoring unit 57. Specifically, the learning control unit 42 determines that the work has been completed when the current work state is the work state corresponding to "completion" and the value of the certainty degree is equal to or higher than the threshold value.

Further, in the first embodiment, since the similarity degree is also used in the determination step (S103) and the like, the determination step and the like can be performed using the certainty degree. Specifically, the determination unit 44 determines that the work cannot be continued when the determination unit 44 determined that the current value of the certainty degree is lower than the threshold value based on the certainty output by the certainty monitoring unit 57. This is because if the value of the certainty degree is low, the current work state is likely to be different from the learned work state.

Further, the certainty degree can be used as information for the operator to identify the current correct work state as well as the similarity degree of the first embodiment. Specifically, the notification unit 45 outputs the first notification signal indicating that the work cannot be continued to the display device 22, and outputs the second notification signal indicating the certainty degree to the display device 22.

In this way, by using the progress degree and/or the certainty degree, the degree of progress of the work can be quantified, so that a more accurate determination can be performed.

As described above, the robot system 1 includes a robot 10, state detection sensors 11 to 13, a timekeeping unit 46, a learning control unit 42, a determination unit 44, an operation device 21, and an input unit 23. The switching device 30 and the additional learning unit 43. The robot 10 performs work based on an operation command. The state detection sensors 11 to 13 detect and output a state value indicating the progress state of the work of the robot 10. The timekeeping unit 46 outputs a timer signal at predetermined time intervals. The learning control unit 42 outputs a calculation operation force based on the state value detected by the state detection sensor 11 to 13 and the timer signal by using a model, the model being constructed by machine learning of a work state, a next work state associated with the work state, and at least one set of the state value and the operation force associated with the state value. The determination unit 44 outputs a determination result indicating whether or not the work of the robot 10 can be continued under the control of the learning control unit 42 based on the state values detected by the state detection sensors 11 to 13 (determination step). The operation device 21 is operated by an operator, the operation device being detecting and outputting an operator operation force that is an operation force applied by the operator. The input unit 23 (key in the figure) receives and outputs the input of the work state by the operator. The switching device 30 converts either the operator operation force or the calculation operation force into an operation command and outputs the operation command based on the operator operation force and the calculation operation force. The additional learning unit 43 additionally learns the work state, the next work state associated with the work state, and at least one set of the state value and the operation force associated with the state value and updating the model based on the determination result indicating that the work of the robot 10 cannot be continued, the work state output by the input unit 23, the operator operation force output by the operation device 21, the state value detected by the state detection sensor 11 to 13, and the timer signal (additional learning process).

As a result, by additionally learning the current and next work states, the operation force, and the state values, even if the robot 10 cannot continue the work, the robot system 1 autonomously solves the problem. It becomes possible to continue the work.

In the robot system 1 of the above embodiment, the additional learning unit 43 calculates the next work state associated with the work state based on the state value and updates the model by additionally learning the work state (state transition completion determination step), the next work state, the state value, and the operator operation force.

In the robot system 1 of the above embodiment, the input unit 23 receives the input by the operator in the next work state associated with the input work state and outputs it to the additional learning unit 43. The additional learning unit 43 performs the additional machine learning of the work state, the next work state, the state value, and the operator operation force and updates the model.

As a result, the work of the robot 10 can be additionally learned so as to include the transition of the work state, and the work of the robot 10 can be additionally learned more appropriately.

In the robot system 1 of the above embodiment, the additional learning unit 43 calculates the next work state associated with the work state based on the state value and updates the model by additionally learning the work state, the next work state, the state value, and the operator operation force.

As a result, the operation of the robot 10 can be additionally learned with high accuracy.

In the robot system 1 of the above embodiment, the switching device 30 converts either the operator operation force or the calculation operation force into the operation command based on a setting signal for converting either the operator operation force or the calculation operation force and the switching device outputs the operation command.

As a result, the state in which the operator operates the robot 10 and the state in which the robot system 1 performs autonomous operation can be switched from the outside of the switching device 30, particularly the control unit 40.

In the robot system 1 of the above embodiment, the switching device 30 includes a sensor. The sensor detects magnitude of the operator operation force output by the operation device 21. The switching device 30 converts either the operator operation force or the calculation operation force into an operation command and outputs the operation command based on the magnitude of the detected operator operation force.

As a result, the switching device 30 can be in a state in which the operator operates the robot 10 while the operator is operating the operation unit 20.

In the robot system 1 of the above embodiment, the learning control unit 42 interrupts the output of the calculation operation force based on the determination result indicating that the work of the robot to cannot be continued. The learning control unit 42 resumes the output of the calculation operation force when the learning control unit 42 determines that the additional learning is completed.

As a result, when the work of the robot 10 cannot be continued under the control of the learning control unit 42, it is possible to suppress the risk of unnecessary operation of the robot 10 due to the calculation operation force.

In the robot system 1 of the above embodiment, the robot system 1 includes a notification unit 45 and a display device 22. The notification unit 45 outputs a notification signal based on the determination result indicating that the work of the robot cannot be continued (notification step). The display device 22 displays based on the notification signal.

As a result, the operator can accurately grasp the timing at which the additional learning of the work of the robot 10 is required, the information related to the additional learning, and the like.

In the robot system 1 of the above embodiment, the learning control unit 42 calculates and outputs the similarity degree indicating the degree of similarity of the current state value and the work state in the model based on the state values detected by the state detection sensors 11 to 13. The notification unit 45 calculates and outputs the similarity and the notification signal (first and second notification signals) based on the determination result indicating that the work of the robot 10 cannot be continued.

As a result, since the display device 22 displays the notified similarity degree, the operator can accurately identify the current work state.

In the robot system 1 of the above embodiment, the learning control unit 42 calculates a similarity degree indicating a degree to which the current state value is similar to the specific work state in the model based on the state value detected by the state detection sensor 11 to 13 and the learning control unit outputs the similarity degree. The determination unit 44 outputs the determination result based on the state value and the similarity degree.

For example, if it is determined that they are not similar to any of the work states based on the similarity degree, it may be an unknown state and it may be difficult for the robot system 1 to continue the work. In this way, by using the similarity degree, it is possible to accurately determine whether or not the work can be continued.

The robot system 1 of the above embodiment includes a certainty acquisition unit 52 for acquiring a certainty degree indicating a degree of certainty of estimation when the model estimates and outputs the calculation operation force according to the input data input to the model. The notification unit 45 outputs the notification signal based on the certainty degree and the determination result indicating that the work of the robot 10 cannot be continued.

As a result, the operator can accurately identify the current work state based on the certainty degree displayed on the display device 22.

The robot system 1 of the above embodiment includes a certainty acquisition unit 52 for acquiring a certainty degree indicating a degree of certainty of estimation when the model estimates and outputs the calculation operation force according to the input data input to the model. The determination unit 44 outputs a determination result based on the certainty degree.

For example, when the certainty degree is low, it is likely that it is difficult for the robot system 1 to continue the work because it is in an unknown work state or a state similar to it. In this way, by using the certainty degree, it is possible to accurately determine whether or not the work can be continued.

The robot system 1 of the above embodiment includes a progress acquisition unit 51 acquiring a progress degree indicating that the work state of the robot realized by the calculation operation force output by the model corresponds to a degree of progress of the work of the robot 10. The determination unit 44 outputs a determination result based on the progress degree.

For example, if the progress degree does not change, there is a high possibility that the work by the robot 10 is stagnant.

In this way, by using the progress degree, it is possible to accurately determine whether or not the work can be continued on the robot system 1 side.

In the robot system 1 of the above embodiment, when the additional learning unit 43 determines that the work state input to the input unit 23 is included in the model, the additional learning unit 43 modifies an estimate standard of the work state in the model based on the state value detected by the state detection sensor 11 to 13.

As a result, it is possible to set the model in which the learning control unit 42 can more accurately estimate the work state.

In the robot system 1 of the above embodiment, when the additional learning unit 43 determines that the work state input to the input unit 23 is not included in the model, the additional learning unit 43 registers the work state input to the input unit 23 in the model based on the state value detected by the state detection sensor 11 to 13 (work state registration process).

As a result, even if all work states are not covered at the time of prior machine learning, new work states can be additionally learned.

In the robot system 1 of the above embodiment, the timekeeping unit 46 outputs the timer signal based on a trigger signal. The timer signal is output at the predetermined time interval from the time when the trigger signal is received. The learning control unit 42 outputs the trigger signal when starting the output of the calculation operation force. The additional learning unit 43 outputs the trigger signal when detecting the input of the operator operation force.

As a result, it is possible to reduce the influence of the additional learning of the movement of the robot 10 and the delay caused by the movement of the robot 10.

While a preferred embodiment of the present invention have been described above, the configurations described above may be modified, for example, as follows.

The content of the flowchart of FIG. 5 is an example, and processing may be added, processing may be omitted, processing order may be changed, or the like. For example, in a situation where the operator can specify the work state without displaying the similarity degree, the calculation and output of the similarity may be omitted. The data related to the additional learning may be accumulated, and the additional learning may be performed after the data is accumulated to some extent.

The data given as the state value is an example, and different data may be used as the state value. For example, when the data related to the direction is used as the state value, the process can be simplified by using the data in the coordinate system common to the robot 10 and the operator (operation device 21 and display device 22).

In the above embodiment, it is assumed that each device constituting the robot system 1 is arranged at the same work site, but if information can be exchanged via a network, at least one device (for example, an operation device 21) may be located in a remote location. Further, at least a part of the functions of the control unit 40 may be arranged at physically separated positions. The present invention can also be applied to the robot system 1 that does not have the operation device 21.

The progress degree and the certainty degree can be arbitrary, and can be, for example, 0 to 1.

In the above embodiment, the robot 10 is attached to the pedestal portion, but it may be configured to be able to travel autonomously. Further, the robot 10 may be configured to perform work with a member other than the arm portion.

REFERENCE SIGNS LIST 1 robot system
10 robot
11 motion sensor
12 force sensor
13 camera
21 operation device
22 display device
23 input unit
30 switching device
40 control unit
41 communication unit
42 learning control unit
43 additional Learning unit
44 determination unit
45 notification unit
46 timekeeping unit

The invention claimed is:

1. A robot system comprising:
a robot configured to work based on an operation command;
a state detection sensor configured to detect and output a state value that indicates progress of work of the robot;
a control unit configured to function as
  a learning control unit that outputs a calculation operation force based on the state value detected by the state detection sensor by using a model, the model being constructed by machine learning of a work state, a next work state associated with the work state, and at least one set of the state value and the operation force associated with the state value; and
  a determination unit that outputs a determination result indicating whether or not the work of the robot can be continued under the control of the learning control unit based on the state value detected by the state detection sensor;
an operation device configured to be operated by an operator, the operation device being configured to detect and output an operator operation force that is an operation force applied by the operator;
an input device configured to accept an input of the work state by the operator and outputting the input; and
a switching device that receives the operator operation force applied by the operator in order to move the robot, the switching device being configured to convert the operator operation force into the operation command when the operator operation force is selected, and convert the calculation operation force into the operation command when the calculation operation force is selected, and output the operation command, wherein
the control unit is further configured to function as an additional learning unit that additionally learns the work state, the next work state associated with the work state, and at least one set of the state value and the operation force associated with the state value and updating the model based on the determination result indicating that the work of the robot cannot be continued, the work state output by the input device, the operator operation force output by the operation device for resolving a state in which the work cannot be continued, and the state value detected by the state detection sensor.

2. The robot system according to claim 1,
wherein the additional learning unit calculates the next work state associated with the work state based on the state value and updates the model by additionally learning the work state, the next work state, the state value, and the operator operation force.

3. The robot system according to claim 1,
wherein the input device receives the input by the operator of the next work state associated with the input work state and outputs the input to the additional learning unit, and
wherein the additional learning unit additionally learns the work state, the next work state, the state value, and the operator operation force and updates the model.

4. The robot system according to claim 1,
wherein when the work state is different from the next work state, the additional learning unit additionally learns the work state, the next work state, and a plurality of sets of the state value and the operator operation force associated with the state value and updates the model.

5. The robot system according to claim 1,
wherein the switching device converts either the operator operation force or the calculation operation force into the operation command based on a setting signal for converting either the operator operation force or the calculation operation force and the switching device outputs the operation command.

6. The robot system according to claim 1,
wherein the switching device includes a sensor that detects magnitude of the operator operation force output by the operation device, and
wherein the switching device converts either the operator operation force or the calculation operation force into the operation command based on the magnitude of the detected operator operation force and the switching device outputs the command operation.

7. The robot system according to claim 1,
wherein the learning control unit interrupts the output of the calculation operation force based on the determination result indicating that the work of the robot cannot be continued, and
wherein the learning control unit resumes the output of the calculation operation force when the learning control unit determines that the additional learning is completed.

8. The robot system according to claim 1, wherein the control unit is further configured to function as
a notification unit that outputs a notification signal based on the determination result indicating that the work of the robot cannot be continued; and
the robot system further comprises:
a display device that displays based on the notification signal.

9. The robot system according to claim 8,
wherein the learning control unit calculates a similarity degree indicating a degree to which the current state value is similar to the specific work state in the model based on the state value detected by the state detection sensor and the learning control unit outputs the similarity degree, and
wherein the notification unit outputs the notification signal based on the similarity degree and the determination result indicating that the work of the robot cannot be continued.

10. The robot system according to claim 1,
wherein the learning control unit calculates a similarity degree indicating a degree to which the current state value is similar to the specific work state in the model based on the state value detected by the state detection sensor and the learning control unit outputs the similarity degree, and
wherein the determination unit outputs the determination result based on the state value and the similarity degree.

11. The robot system according to claim 8, wherein
the control unit is further configured to function as a certainty acquisition unit that acquires a certainty degree indicating a degree of certainty of estimation when the model estimates and outputs the calculation operation force according to the input data input to the model, and
the notification unit outputs the notification signal based on the certainty degree and the determination result indicating that the work of the robot cannot be continued.

12. The robot system according to claim 1, wherein
the control unit is further configured to function as a certainty acquisition unit that acquires a certainty degree indicating a degree of certainty of estimation when the model estimates and outputs the calculation operation force according to the input data input to the model, and
the determination unit outputs the determination result based on the certainty degree.

13. The robot system according to claim 1, wherein
the control unit is further configured to function as a progress acquisition unit that acquires a progress degree indicating that the work state of the robot realized by the calculation operation force output by the model corresponds to a degree of progress of the work of the robot, and
the determination unit outputs the determination result based on the progress degree.

14. The robot system according to claim 1,
wherein when the additional learning unit determines that the work state input to the input device is included in the model, the additional learning unit modifies an estimate standard of the work state in the model based on the state value detected by the state detection sensor.

15. The robot system according to claim 1,
wherein when the additional learning unit determines that the work state input to the input device is not included in the model, the additional learning unit registers the work state input to the input device in the model based on the state value detected by the state detection sensor.

16. An additional learning method for a robot system, the robot system comprising:
a robot configured to work based on an operation command;
a state detection sensor configured to detect and output a state value that indicates progress of work of the robot;
a control unit configured to function as a learning control unit that outputs a calculation operation force based on the state value detected by the state detection sensor by using a model, the model being constructed by machine learning of a work state, a next work state associated with the work state, and at least one set of the state value and the operation force associated with the state value;
an operation device configured to be operated by an operator, the operation device being configured to detect and output an operator operation force that is an operation force applied by the operator; and
a switching device that receives the operator operation force applied by the operator in order to move the robot, the switching device being configured to convert the operator operation force into the operation command when the operator operation force is selected, and convert the calculation operation force into the operation command when the calculation operation force is selected, and output the operation command, the method comprising:

a determination step outputting a determination result indicating whether or not the work of the robot can be continued under the control of the learning control unit based on the state value detected by the state detection sensor;

an input receiving step accepting input of the work state and the operator operation force from the operation device; and an additional learning step additionally learning the work state, the next work state associated with the work state, and at least one set of the state value and the operation force associated with the state value and updating the model based on the determination result indicating that the work of the robot cannot be continued, the work state input in the input receiving step, the operator operation force input in the input receiving step for resolving a state in which the work cannot be continued, and the state value detected by the state detection sensor.

17. A robot system comprising:

a robot configured to work based on an operation command;

a state detection sensor configured to detect and output a state value that indicates progress of work of the robot;

a control unit configured to function as a timekeeping unit that outputs a timer signal at predetermined time intervals;

a learning control unit that outputs a calculation operation force based on the state value detected by the state detection sensor and the timer signal by using a model, the model being constructed by machine learning of a work state, a next work state associated with the work state, and at least one set of the state value and the operation force associated with the state value; and a determination unit that outputs a determination result indicating whether or not the work of the robot can be continued under the control of the learning control unit based on the state value detected by the state detection sensor;

an operation device configured to be operated by an operator, the operation device being configured to detect and output an operator operation force that is an operation force applied by the operator;

an input device configured to accept an input of the work state by the operator and outputting the input; and a switching device that receives the operator operation force applied by the operator in order to move the robot, the switching device being configured to convert the operator operation force into the operation command when the operator operation force is selected, and convert the calculation operation force into the operation command when the calculation operation force is selected, and output the operation command, wherein the control unit is further configured to function as an additional learning unit that additionally learns the work state, the next work state associated with the work state, and at least one set of the state value and the operation force associated with the state value and updating the model based on the determination result indicating that the work of the robot cannot be continued, the work state output by the input device, the operator operation force output by the operation device for resolving a state in which the work cannot be continued, the state value detected by the state detection sensor, and the timer signal.

18. The robot system according to claim 17, wherein the additional learning unit calculates the next work state associated with the work state based on the state value and updates the model by additionally learning the work state, the next work state, the state value, and the operator operation force.

19. The robot system according to claim 17, wherein the timekeeping unit outputs the timer signal based on a trigger signal and the timer signal is output at the predetermined time interval from the time when the trigger signal is received, wherein the learning control unit outputs the trigger signal when starting the output of the calculation operation force, and wherein the additional learning unit outputs the trigger signal when detecting the input of the operator operation force.

* * * * *